United States Patent [19]
Yoshizawa et al.

[11] Patent Number: 5,768,441
[45] Date of Patent: Jun. 16, 1998

[54] IMAGE PROCESSING METHOD AND APPARATUS

[75] Inventors: Koichi Yoshizawa; Naoki Kuwata, both of Suwa, Japan

[73] Assignee: Seiko Epson Corporation, Tokyo, Japan

[21] Appl. No.: 556,889

[22] Filed: Nov. 2, 1995

[30] Foreign Application Priority Data

Nov. 9, 1994 [JP] Japan ..................... 6-275387

[51] Int. Cl.$^6$ .................. G06K 9/38; G06K 9/00
[52] U.S. Cl. .............. 382/270; 382/172; 358/464; 358/465; 358/466
[58] Field of Search .................... 382/270, 172; 358/464, 465, 466

[56] References Cited

U.S. PATENT DOCUMENTS

| | | | |
|---|---|---|---|
| 4,731,863 | 3/1988 | Sezan et al. | 382/172 |
| 5,351,313 | 9/1994 | Bessho et al. | 358/466 |

*Primary Examiner*—Leo Boudreau
*Assistant Examiner*—Daniel G. Mariam
*Attorney, Agent, or Firm*—W. Glen Johnson; Eric B. Janofsky

[57] ABSTRACT

An image processing method and an image processing apparatus for determining the best digitizing threshold value, thereby enabling best-case digitizing across the entire input image, even when determination of a subject image within an image block is mistaken. The input image is separated into plural blocks; a temporary digitization threshold value is calculated for each of the separated blocks; the presence of text characters or other predetermined subject images is evaluated in each of the separated blocks; and block information for each of the separated blocks, including the temporary digitization threshold value, subject presence information, and the final digitization threshold value of each block for which said threshold value has been determined, is referenced to determine the final digitization threshold value for each block. Each block is then digitized using these best-case threshold values to achieve consistent, best-case digitization across the entire input image.

34 Claims, 21 Drawing Sheets

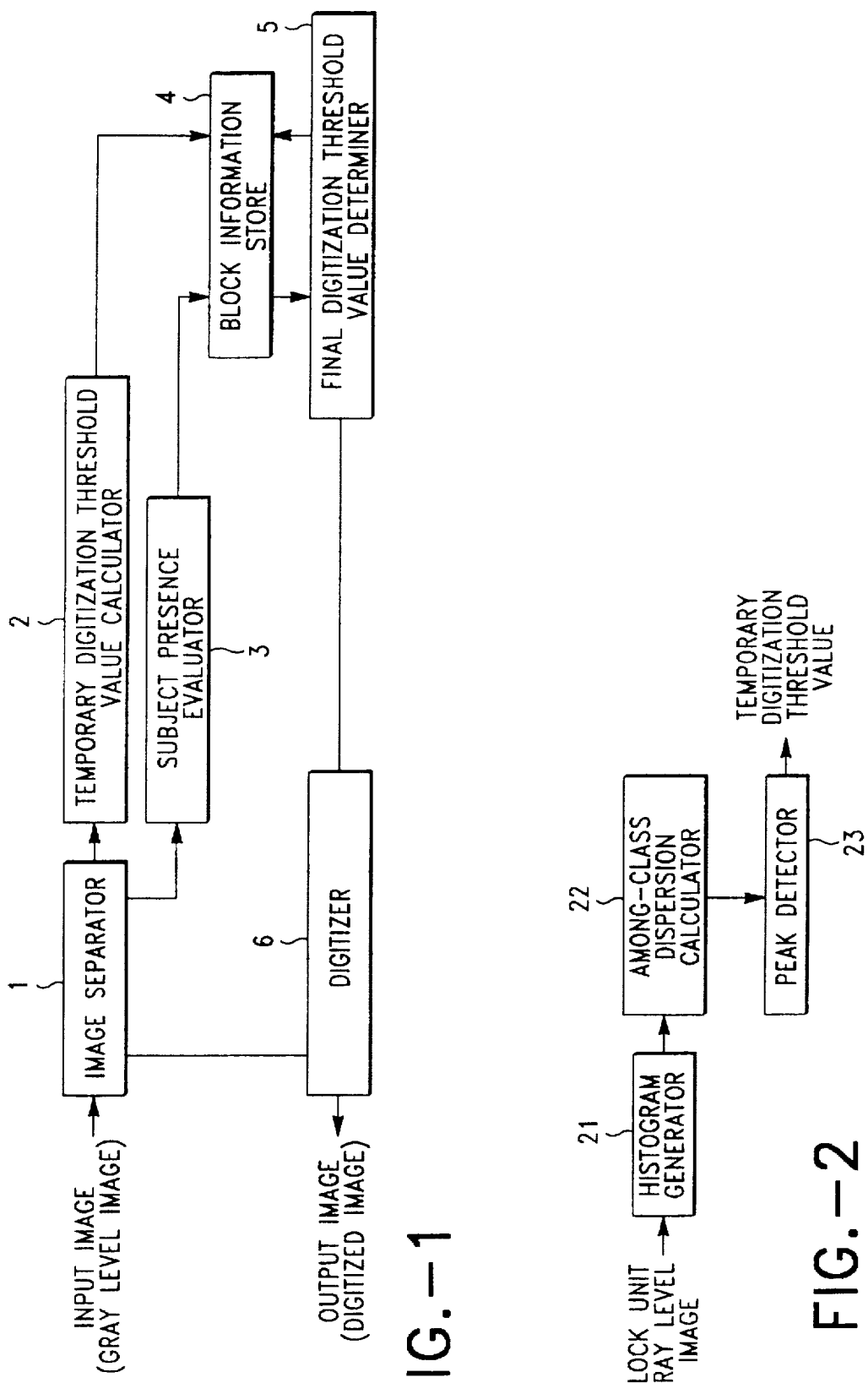

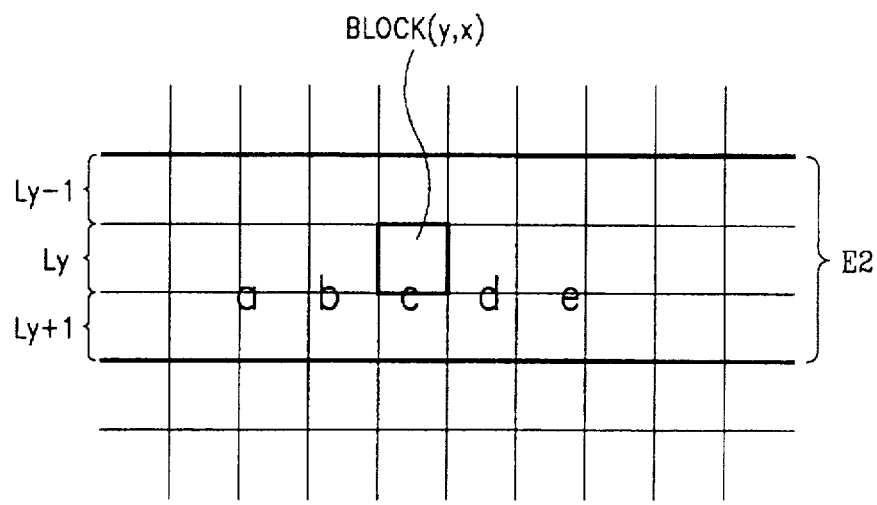
FIG.—14A
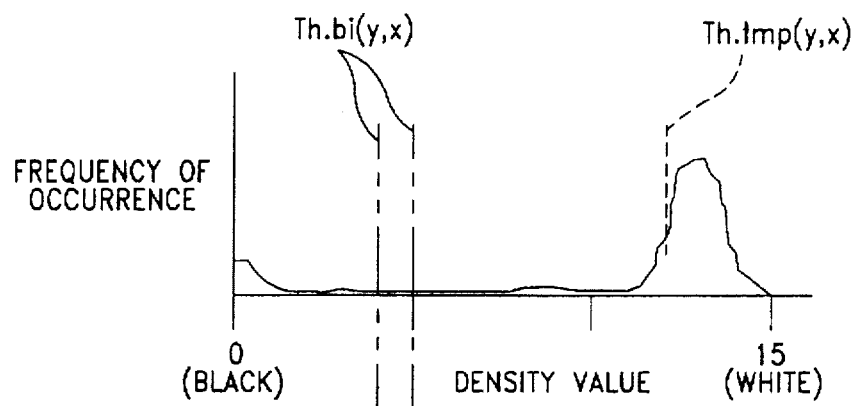
FIG.—14B
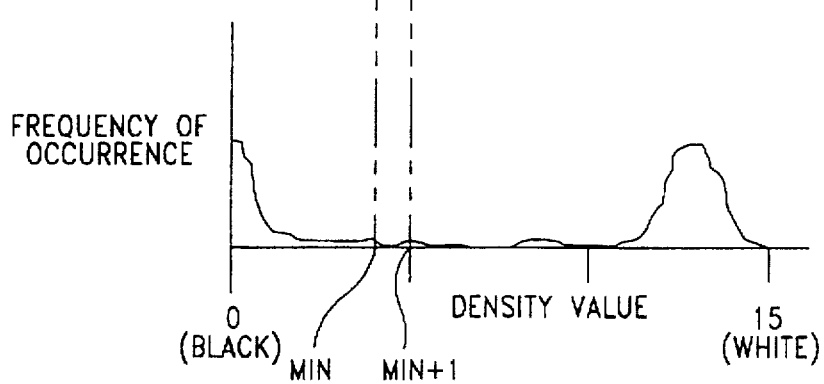
FIG.—14C

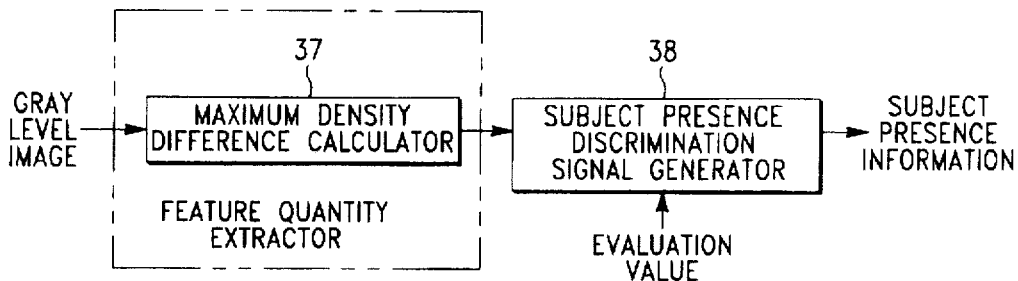
FIG.—23
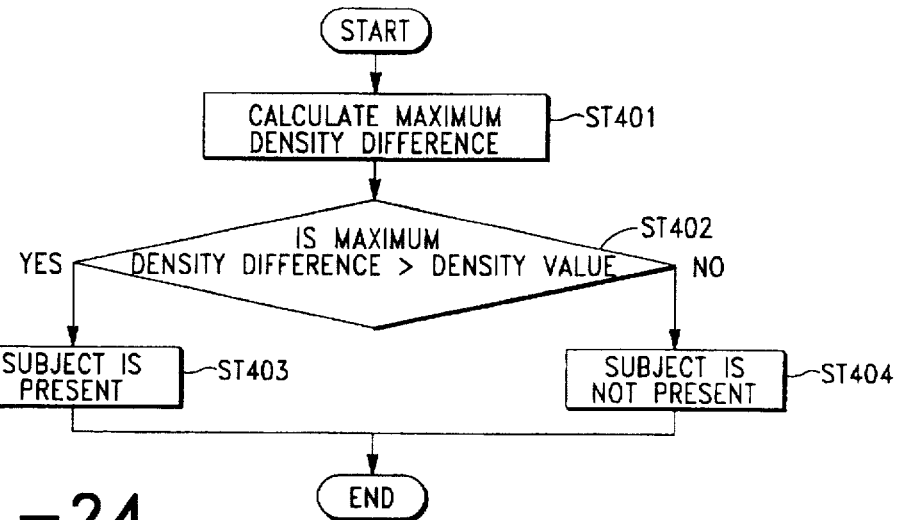
FIG.—24
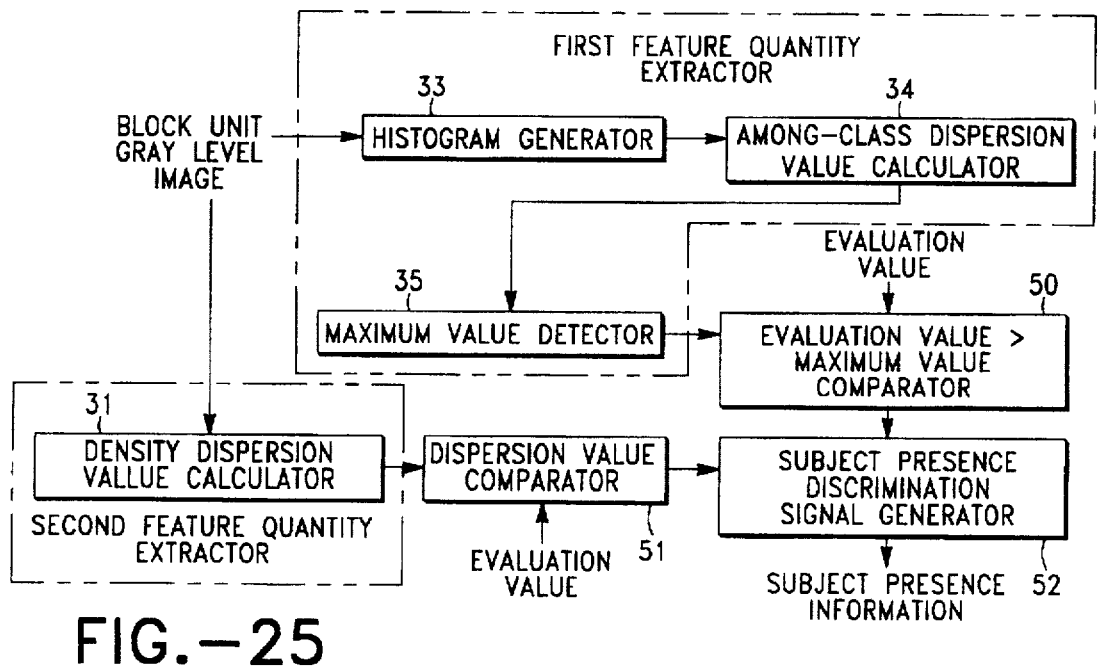
FIG.—25

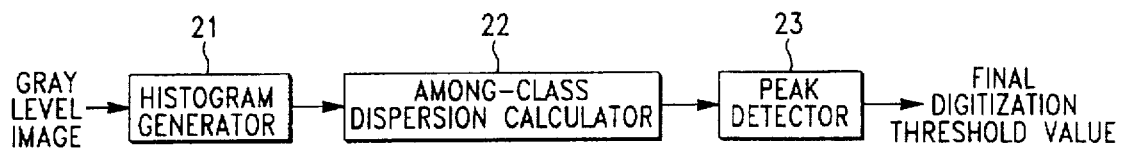
FIG.—26
(PRIOR ART)
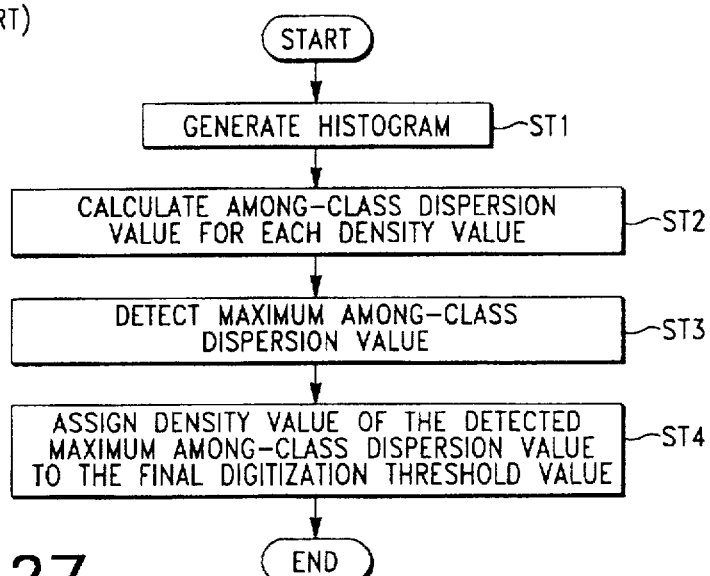
FIG.—27
(PRIOR ART)
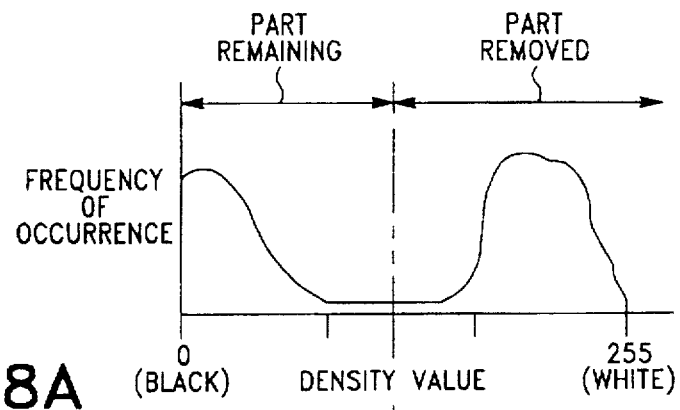
FIG.—28A
(PRIOR ART)
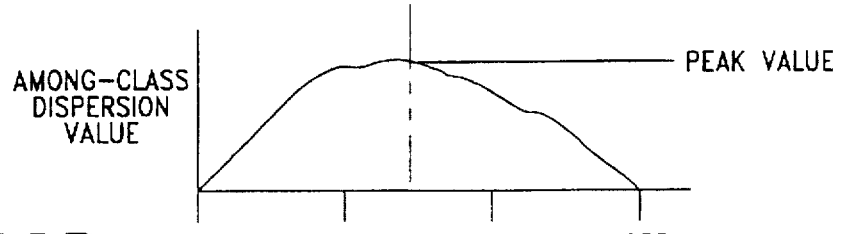
FIG.—28B
(PRIOR ART)

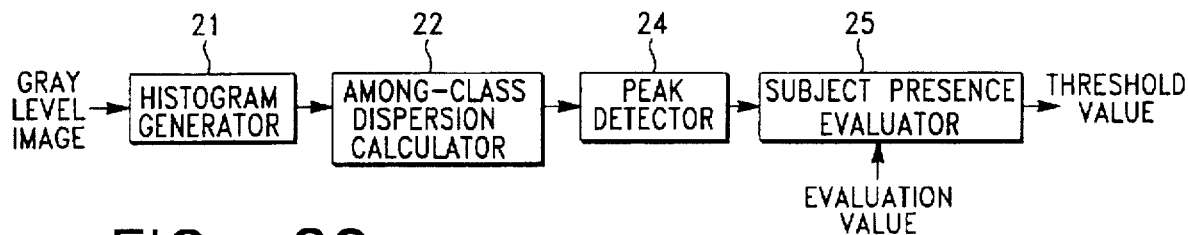
FIG.—29
(PRIOR ART)
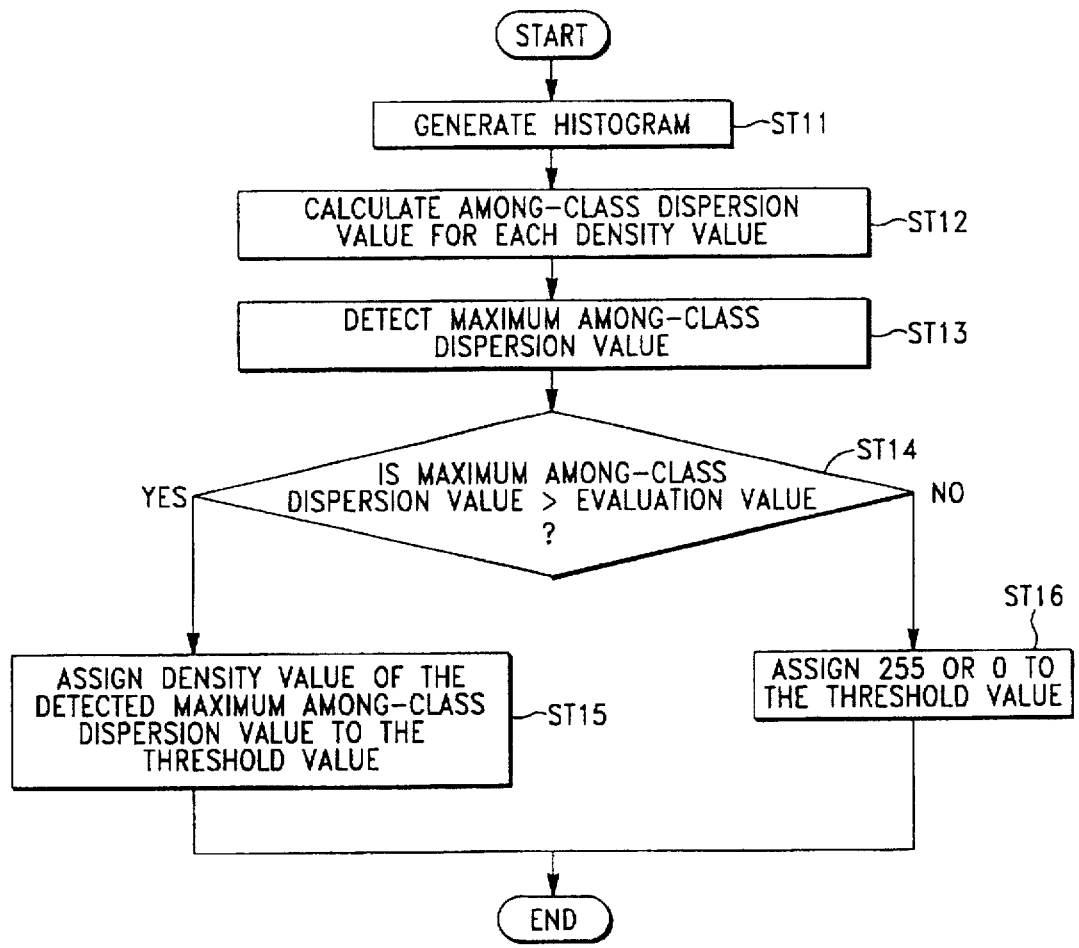
FIG.—30
(PRIOR ART)

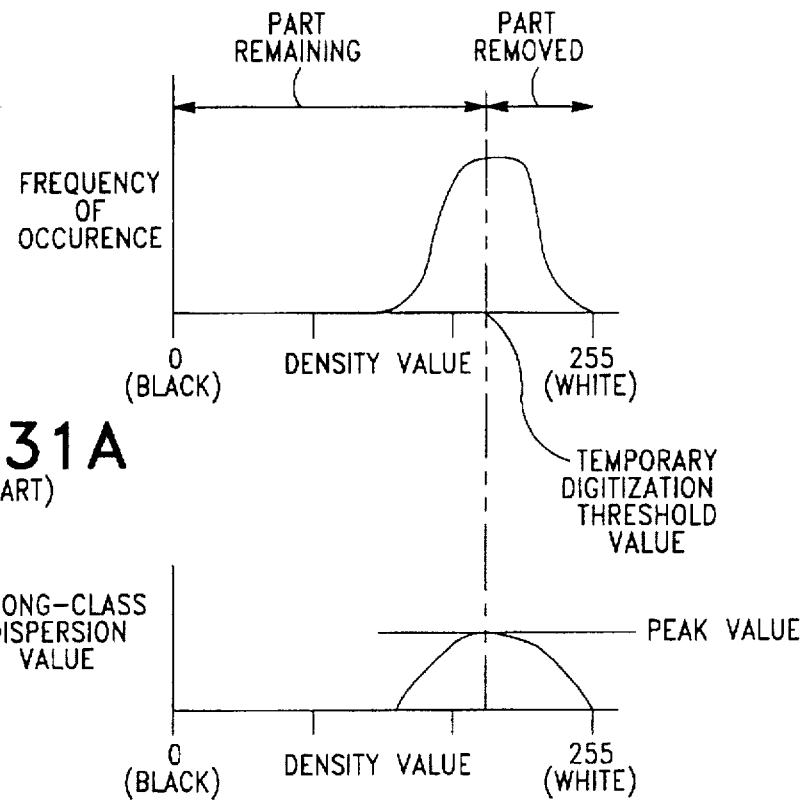
FIG.—31A
(PRIOR ART)
FIG.—31B
(PRIOR ART)
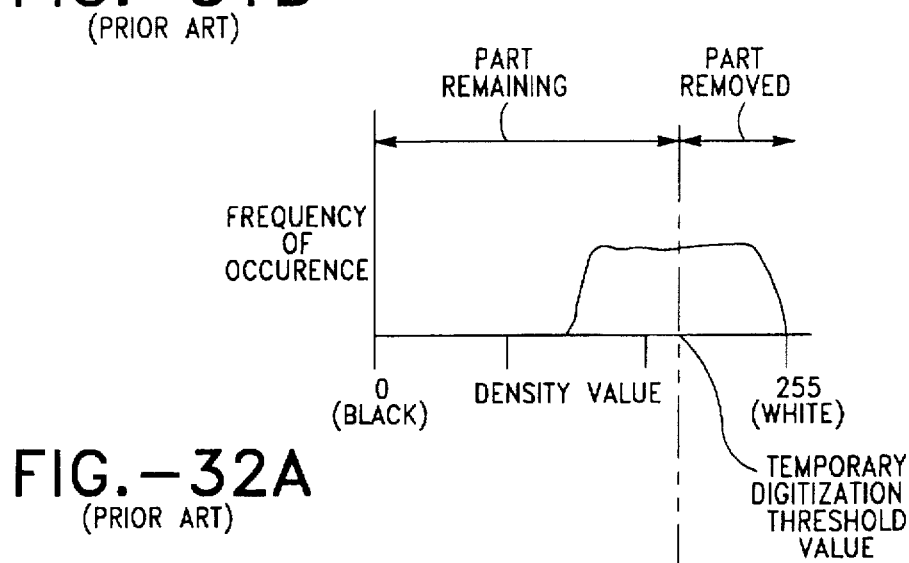
FIG.—32A
(PRIOR ART)
FIG.—32B
(PRIOR ART)

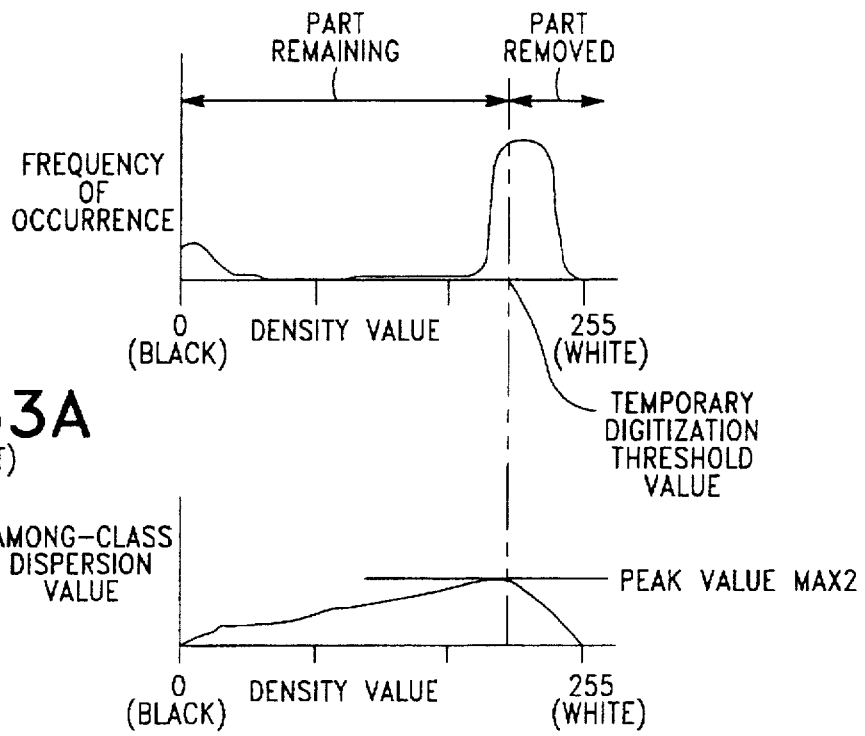
FIG.-33A (PRIOR ART)
FIG.-33B (PRIOR ART)
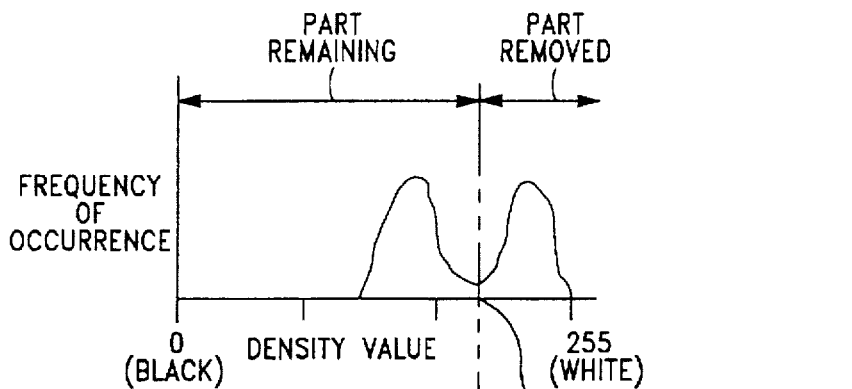
FIG.-34A (PRIOR ART)
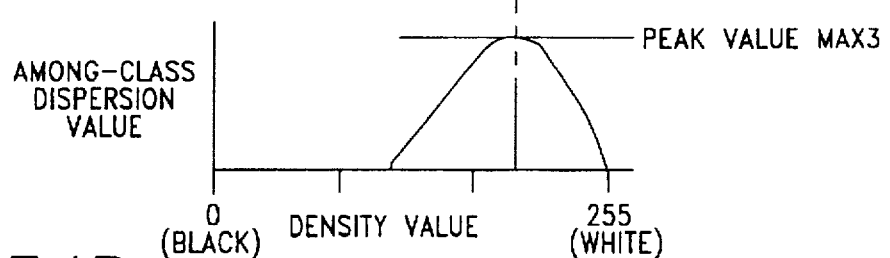
FIG.-34B (PRIOR ART)

IMAGE PROCESSING METHOD AND APPARATUS

BACKGROUND OF THE INVENTION

1. Field of the Invention

The present invention relates to a digital image processing, and is particularly concerned with techniques for setting a best-case digitization threshold value for use in the digitization of grey scale level data obtained through scanning or other image capture methods.

2. Description of the Related Art

Objects of the Invention

Images scanned in by an image scanner or digital camera may also contain text that has been shaded, masked, colored, or otherwise graphically enhanced. While such images can be scanned in 256 levels of gray or color to generate a gray level image signal, it has been difficult to determine the best digitization threshold value to use when digitizing the gray level signal.

More specifically, when separating text from the shaded or colored background, the background information may remain as background noise or text may be blurred if the digitization threshold value, which is used as a reference value for text extraction, is not optimized for the image.

A well-known method of digitizing such gray level image signals generally involves separating the multiple gray level input image into plural image blocks, setting a best-case digitization threshold value for separating each of these image blocks into the background and the target area of the contained text, and then digitizing each block using the resulting digitization threshold value.

More specifically, prior art FIG. 26 is a block diagram of a conventional digitization threshold value determining system which utilizes the "Otsu method" as is known in the image processing arts, and is described in the Otsu, N. *Journal of the Electrical Communications Society* (Japan 1980), vol. J63-D, no. 4, p. 349 as well as in Otsu, N. "A Threshold selection Method from Gray-Level Histograms", *IEEE transactions on Systems, Man, and Cybernetics*, vol. SMC-9, no. 1, (Jan. 1, 1979) pp. 62–66. As described therein, this digitization threshold value determining system includes a histogram generator 21 for generating a density histogram from the gray level input image; an among-class dispersion calculator 22 for obtaining the among-class dispersion value of each density value in the density histogram obtained by the histogram generator 21; and a peak detector 23 for detecting the peak among-class dispersion value among the among-class dispersion values detected by the among-class dispersion calculator 22, and outputting this peak value as the digitization threshold value.

A corresponding flow chart for this embodiment of the Otsu method is shown in FIG. 27. Control begins at step ST1, upon detection of a 256 gray scale image as input data, it is directed to the histogram generator 21 of the determining system illustrated in prior art FIG. 26. In turn, histogram generator 21 generates a density histogram for each of the 256-level density levels in the input image. Then, in step ST2, this density histogram is relayed to the among-class dispersion calculator 22 for calculating the among-class dispersion value corresponding to each density level in the image. Assuming the pixels of a given picture may be represented in L gray levels [1,2, . . . L], the among-class dispersion values are calculated as follows:

First, the probability of occurrence for density or gray level i is obtained as $p_i = n_i/N$, where $n_i$=number of pixels at gray level i and N=total number of pixels (N=$n_1+n_2+ \ldots +n_L$).

The probability of occurrence $p_i$ is then used to calculate the total average level μT of the L gray scale level image as $$\mu T = \sum_{i=1}^{L} i p_i \quad [1]$$

Using the total average level μT of the image and the two sums (i)(k) and μ(k) at a particular gray level k, defined, respectively, as $$\omega(k) = \sum_{i=1}^{k} p_i \quad [2]$$

and $$\mu(k) = \sum_{i=1}^{k} i p_i \quad [3]$$

the among-class dispersion value σB(k) of the density level k is obtained as $$\sigma_B^2(k) = \frac{|\mu T \omega(k) - \mu(k)|^2}{\omega(k)[1 - \omega(k)]} \quad [4]$$

Referring still to FIGS. 26 and 27, control transfers to step ST3, in which the among-class dispersion values for all density levels calculated as above by the among-class dispersion calculator 22 are input to the peak detector 23. The peak detector 23 determines the maximum among class dispersion value and, in step ST4, assigns it to be the digitization threshold value for subsequent image processing tasks.

Steps ST3 and ST4 shown in prior art FIG. 27 may be described more specifically with reference to prior art FIGS. 28A and 28B. FIG. 28A represents an example of a density histogram generated for one block containing both text and background information in the input image. In this example, the frequency of occurrence of density levels is approximately equal on the white and black sides. The curve of the among-class dispersion values obtained from this density value histogram is as shown in FIG. 28B. The density value corresponding to the peak value of this curve represents the digitization threshold value according to the Otsu method.

However, a critical shortcoming of the Otsu method lies in the assumption that both text or subject information and background are present in the image to be processed when setting the digitization threshold value. As a result, a digitization threshold value is computed even for situations where only background information is present (no text or "foreground" subject matter is defined ), resulting in an inaccurate digitization threshold which retains the background as noise.

This problem is exemplified in prior art FIGS. 31A and 31B. FIG. 31A is a density histogram of image portions or blocks containing only background information, and FIG. 31B is the corresponding among-class dispersion value curve. The temporary digitization threshold value is thus the density value at the dashed vertical line position shown in FIG. 31 (*a*), and depicts a significant portion of background data which remains as noise after digitization.

To address Otsu's noise problem, another conventional digitization threshold value determining technique has been utilized, as is described in Japanese laid open patent application number H4-286083 (1992-28). This method resolves Otsu's noise problem by including an evaluator which determines if subject text or objects are present in the gray level input image for which the digitization threshold value is to be determined. This evaluation is accomplished by comparing a predetermined evaluation value with the peak among-class dispersion value. More specifically, if the peak among-class dispersion value is less than the evaluation value, subject text or objects are determined to not be present; if greater, subject text or objects are determined to be present.

Prior art FIG. 29 depicts the digitization threshold value determining system according to this technique, which similarly comprises a histogram generator 21 and among-class dispersion calculator 22 as shown and described with respect to prior art FIG. 26 above. The digitization threshold value determining system of this example further comprises peak detector 24 for detecting the peak among-class dispersion value among the among-class dispersion values detected by among-class dispersion calculator 22. While this function of peak detector 24 is the same as that of peak detector 23 shown in FIG. 26, the peak detector in FIG. 29 differs from that in FIG. 26 in that both the detected peak among-class dispersion value and the corresponding density value are output from peak detector 24.

A predetermined evaluation value and the feature quantity (the peak among-class dispersion value in this example) output from peak detector 24 are applied as input parameters to subject presence evaluator 25 for comparison. If the peak among-class dispersion value is greater than the evaluation value, the density value output by the peak detector 24 is output as the final digitization threshold value; if the peak value is less than or equal to the evaluation value, a predetermined digitization threshold value of "255" or "0" is output as the final digitization threshold value.

This process for determining the final digitization threshold value is described further with reference to the prior art flow chart depicted in FIG. 30 in conjunction with FIG. 29 described above. Assume again that a 256-level gray-scale image is the input image.

As in the first example above, the 256-level gray scale input image is input to histogram generator 21, which initiates control to step ST11. At step ST11, the histogram generator 21 generates a density histogram for each of the 256-level density levels for the received input image. The density histogram is then input to among-class dispersion calculator 22. Next, at step ST12, the dispersion calculator 22 calculates the among-class dispersion value of each gray or density level for the image. The among-class dispersion values for all density values thus obtained by among-class dispersion calculator 22 are then input to peak detector 24.

Control thereafter passes to step ST13. At step ST13, the maximum among-class dispersion value is detected by peak detector 24. The peak among-class dispersion value detected by peak detector 24, and the density value corresponding to this peak among-class dispersion value, are then output to subject presence evaluator 25. Control then passes to step ST14.

At step ST14, a predetermined evaluation value is input from an external source as an input parameter for the comparison executed by subject presence evaluator 25. Then, subject presence evaluator 25 compares the peak among-class dispersion values input from the peak detector 24 with this externally generated evaluation value. If the peak among-class dispersion value is greater than the evaluation value, control passes to step ST15 and the density value corresponding to said peak among-class dispersion value is output as the final digitization threshold value. If, however, the peak among-class dispersion value is less than or equal to the evaluation value, control instead passes to step ST16 where a predetermined digitization threshold value of "255" or "0" is output as the final digitization threshold value.

The following problems develop with this second conventional method, however. These problems are best described by referencing example imaging situations shown in FIGS. 13A, 14A, and 15A, which are also used hereinbelow to describe the preferred embodiments of the present invention.

Two states in which the digitization threshold value must be determined are considered below. In the first example, as shown in FIG. 13A, there is nothing but background in the target block (y, x), and the background is non-uniform and contains irregularities. In the second state, as shown in FIG. 14A, only a small part of subject text or objects are contained within the target block (y, x); specifically, only one part of the character "c" is contained within the target block (y, x).

The conventional density histogram for the target block (y, x) in the first example (FIG. 13A) is as shown in prior art FIG. 32A; that for the second example (FIG. 14A) is as shown in prior art FIG. 33A. The among-class dispersion value curve for the density histogram in the first example is shown in prior art FIG. 32B; that for the second example is shown in FIG. 33B.

As is shown in FIGS. 32B and 33B, the peak among-class dispersion value max1 for the target block (y, x) in the first example is greater than or equal to the peak among-class dispersion value max2 for the target block (y, x) in the second example. This means that the peak of the among-class dispersion values in a block in which subject text or objects are present, though only slightly, may be lower than the peak of the among-class dispersion values in a block containing no part of the subject. As a result, when these peak among-class dispersion values are compared with the external evaluation value, the block containing a component of the subject (block (y,x), FIG. 14A) may be incorrectly determined as not containing subject text or objects, while the block without any subject text or object information may be incorrectly deemed to contain the subject. This is, of course, dependent to some extent on how the evaluation value used is generated, as is well-known in the art. Thus, the determined evaluation results may be inconsistent with the imaging data presented.

More specifically, depending upon the comparison of peak among-class dispersion values and evaluation values, it may not be possible to accurately determine whether subject text or objects are present in the target block. If it is falsely determined by this conventional technique that subject text or objects are not present when, in fact, it is (i.e., it is determined that the peak among-class dispersion value is less than the evaluation value), a no-subject (background only) determination will result, and one of the predetermined threshold values is output. And, if the "0" value is output as the digitization threshold value in this case, the subject will be effectively deleted by subsequent digitization processing.

Furthermore, when subject text or objects are falsely determined to be present when it is not, the density value corresponding to that peak among-class dispersion value will be used as the digitization threshold value, and the background will remain as noise after the digitization process.

Consider also a third example shown in FIG. 15A and its handling by the conventional technique presented in prior art FIGS. 29 and 30 discussed above. FIG. 15A illustrates the case where text is written on white paper with shading or coloring applied only to the area of and around the text. With the subject presence evaluator of this prior art technique being utilized, the density histogram of the area inside the target block (y, x) will be as shown in prior art FIG. 34A and the corresponding among-class dispersion value curve is shown in FIG. 34B.

In this case the peak among-class dispersion value max3 is a large value because there are two regions of different density levels. When compared with the predetermined density value, the target block (y, x) is (falsely) determined to contain subject text or graphics, even though subject text or objects are not present, and the digitization threshold value will cause the background to remain after digitization.

However, as shown in FIG. 15A, subject text or objects are not actually present in the target block (y, x), and the shading or coloring inside the target block is a continuation of the background in the adjacent block. As a result, the shading or coloring should preferably not remain after digitization. This conventional technique, however, falsely determines the subject to be present in the target block, and the shading or coloring therefore remains as noise after digitization.

Moreover, when a character (subject) continues to the boundary between block B and the target block (y, x) as shown in FIG. 15, this "noise" contacts and falsely "extends" the character, and adversely affects the results of character recognition applied to the image after digitization.

SUMMARY OF THE INVENTION

Therefore, an object of the present invention is to provide an image processing method and image processing apparatus for determining the best-case digitization threshold value even when the determination of subject presence in the target block is incorrect or inconclusive, thereby determining a best-case digitization threshold value for all blocks irrespective of subject presence in any block, and thus enabling best-case digitization across the entire input image.

To achieve this and related objects, image processing according to the present invention comprises: 1) image separation for separating the input image into plural blocks; 2) temporary digitization threshold value calculation for calculating a temporary digitization threshold value for each of the blocks separated by the image separation process; 3) subject presence evaluation for determining whether a predetermined subject, such as text characters, is present in each of the blocks separated by the image separation process; 4) block information storage containing digitization threshold values for each block in which the final digitization threshold value has been obtained, along with temporary digitization threshold value and subject presence information obtained for each block through temporary digitization threshold value calculation and subject presence evaluation, respectively; 5) final digitization threshold value determination for determining the final digitization threshold value for each block using the block information stored by the block information storing process; and 6) digitization of the input image using the final digitization threshold value determined for each block.

According to the presently preferred embodiment, temporary digitization threshold value calculation may include histogram generation for generating a density histogram of the input image; among-class dispersion calculation for calculating the among-class dispersion value of each density value in the density histogram obtained by the histogram generating process; and maximum value detection for detecting the maximum among-class dispersion values obtained by the among-class dispersion calculation, and outputting as the temporary digitization threshold value the density value where the among-class dispersion values peak.

Temporary digitization threshold value calculation according to the preferred embodiment may alternatively include histogram generation for generating a density histogram of the input image; peak detection for detecting only the peaks required to obtain the temporary digitization threshold value from the generated density histogram; and temporary digitization threshold value calculation for obtaining the temporary digitization threshold value based on these detected peaks.

Herein, peak detection may further include, when plural peak candidates are present in the generated density histogram, determining whether one of plural peak candidates is the peak required to obtain the temporary digitization threshold value based on the frequency of occurrence of the density value in each of the plural peak candidates and the comparative relationship therebetween.

According to the presently preferred embodiment of the invention, temporary digitization threshold value calculation could also alternatively define as the temporary digitization threshold value the density value corresponding to a predetermined position at either the rise side or the drop side of the detected peak when there is only one peak detected by through peak detection, and defines as the temporary digitization threshold value the density value corresponding to a predetermined position between adjacent peaks when plural peaks are detected by through peak detection.

Subject presence evaluation may preferably include feature quantity extraction for extracting a feature quantity based on the density distribution of the input image in each separated block, along with subject presence discrimination signal generation for determining the subject presence by comparing the feature quantity obtained through feature quantity extraction where a predetermined evaluation value supplied as an input parameter of the comparison operation.

The feature quantity of the density distribution described above may further include data corresponding to the density dispersion value of the input image in each block; the maximum among-class dispersion value obtained based on the density histogram obtained from the input image in each block; or the maximum density difference of the input image in each block.

Subject presence evaluation according to the preferred embodiment may also include feature quantity extraction for extracting as the feature quantity at least two of three feature quantities of the input image in each block; along with subject presence discrimination signal generation for determining the subject presence by comparing the feature quantities obtained through feature quantity extraction against predetermined evaluation values supplied as input parameters of the comparison operation. The three feature quantities of which two are selected through feature quantity extraction preferably are the density dispersion value, the maximum among-class dispersion value, and the maximum density difference.

Also, according to the presently preferred embodiment, final digitization threshold value determination can be characterized through defining a reference range comprising plural blocks proximately adjacent to the target block for which the digitization threshold value is to be determined, and determining the final digitization threshold value of the target block based on the temporary digitization threshold value of the target block and an already-determined final digitization threshold value or temporary digitization threshold value of at least one block included within this reference range.

Image processing according to the presently preferred embodiment may further include, when subject text or objects are determined to not be present in any blocks in the reference range (excluding the target block), determining whether subject text or objects are present in the target block, and defining the digitization threshold value of the target block as the temporary digitization threshold value of the target block when subject text or objects are determined to be present in the target block, and by referencing an already-determined digitization threshold value in the reference range when subject text or objects are determined to not be present in the target block.

Also, image processing may further preferably include, when subject text or objects are determined to be present in one or more blocks of the reference range (excluding the target block), determining whether subject text or objects are present in the target block, and determining the digitization threshold value of the target block from a temporary digitization threshold value in the reference range and the temporary digitization threshold value of the target block when subject text or objects are determined to be present in the target block, and from the temporary digitization threshold values in the reference range when subject text or objects are determined to not be present in the target block.

The final digitization threshold value of the target block can be preferably obtained from: 1) evaluating the temporary digitization threshold value of the target block and the temporary digitization threshold value of at least one block in the reference range; or 2) by obtaining the minimum value of the temporary digitization threshold values of the target block and each block in the reference range, and defining this minimum value as the final digitization threshold value.

Furthermore, when the minimum temporary digitization threshold value is obtained as the final digitization threshold value, the minimum temporary digitization threshold value in the reference range may be adjusted, depending upon the conditions, using a predetermined value added to this minimum reference range value to obtain the final digitization threshold value.

Image processing according to the presently preferred embodiment may further define the reference range relative to the target block in the line direction as a variable number of blocks dependent upon the presence of the subject in each block, and in the column direction as at least one block line above and one block line below the block line of the target block.

In operation, image processing according to the preferred embodiment divides the input image into a plurality of discrete image blocks, and calculates for each a temporary digitization threshold value. Next, subject presence is preferably determined on a block per block basis, and the resultant temporary digitization and subject presence information is stored for each block. Subsequently, final digitization threshold evaluation is then iteratively determined and retained for each image block based on the stored block information. The input image is then digitized using these final digitization threshold values.

Further, a reference range of plural blocks around the target block for which the digitization threshold value is to be determined is compiled as part of the digitization threshold value determination process. The final digitization threshold value of each block is then determined by referencing such information as: information indicating the subject presence in the target block and each block in the reference range, the smallest temporary digitization threshold value selected from among the temporary digitization threshold values of the blocks in which subjects were determined to be present, and information indicating whether plural different temporary digitization threshold values are present in the reference range.

More specifically, when there are no blocks, excluding the target block, in the reference range in which subject text or objects were determined to be present, it is determined whether subject text or objects are present in the target block. If subjects are present in the target block, the temporary digitization threshold value of the target block is used as the final digitization threshold value for that target block. If subjects are not in the target block, any final digitization threshold values already determined for other blocks in the reference range are referenced, and the final digitization threshold value of the target block is determined from these other already-determined digitization threshold values.

When there are blocks, excluding the target block, in the reference range in which subjects were determined to be present, it is again determined whether subject text or objects are present in the target block. If subject text or objects are present in the target block, the smallest temporary digitization threshold value in the reference range is compared with the temporary digitization threshold value of the target block, and the smaller value is defined as the final digitization threshold value of the target block. If subject text or objects are not in the target block, the smallest temporary digitization threshold value in the reference range is defined as the final digitization threshold value of the target block.

As a result, even when the result of the subject determination in the target block is wrong, a best-case digitization threshold value can be defined, and best-case digitization can be applied to the entire input image.

Other objects and attainments together with a fuller understanding of the invention will become apparent and appreciated by referring to the following description and claims taken in conjunction with the accompanying drawings.

BRIEF DESCRIPTION OF THE DRAWINGS

A better understanding of the present invention may be had in reference to following preferred and alternative embodiments when considered in conjunction with the following drawings, in which:

FIG. 1 is a block diagram of the image processing apparatus according to the preferred embodiment;

FIG. 2 is a more detailed block diagram of the temporary digitization threshold value calculator according to the embodiment shown in FIG. 1;

FIGS. 14A–14C illustrate a third example input image and corresponding digitization threshold information compiled in response thereto according to the embodiment shown in FIG. 1;

FIG. 23 is a more detailed block diagram of another alternative subject presence evaluator which employs a maximum density difference value as the feature quantity according to the present invention;

FIG. 24 is a flow chart used to describe the operation of the subject presence evaluator shown in FIG. 23;

FIG. 25 is a more detailed block diagram of yet another subject presence evaluator which uses an among-class dispersion value and a density dispersion value as the feature quantities;

FIG. 26 is a prior art block diagram of a conventional digitization threshold value determination system;

FIG. 27 is a prior art flow chart used to describe the operation of the conventional digitization threshold value determination system shown in FIG. 26;

FIGS. 28A and 28B illustrate a density histogram and among-class dispersion value curve generated by the conventional digitization threshold value determination system shown in FIG. 26;

FIG. 29 is a prior art block diagram of another conventional digitization threshold value determination system;

FIG. 30 is a prior art flow chart used to describe the operation of the conventional digitization threshold value determination system shown in FIG. 29;

FIGS. 31A–31B shows a graph of the density histogram and its corresponding among-class dispersion value curve generated by the conventional digitization threshold value determination system depicted in FIG. 26; and FIGS. 32A–32B, 33A–33B, and 34A–34B show graphs of density histograms and corresponding among-class dispersion value curves generated by the conventional digitization threshold value determination system depicted in FIG. 29.

DESCRIPTION OF THE PREFERRED EMBODIMENTS

Figure 3:
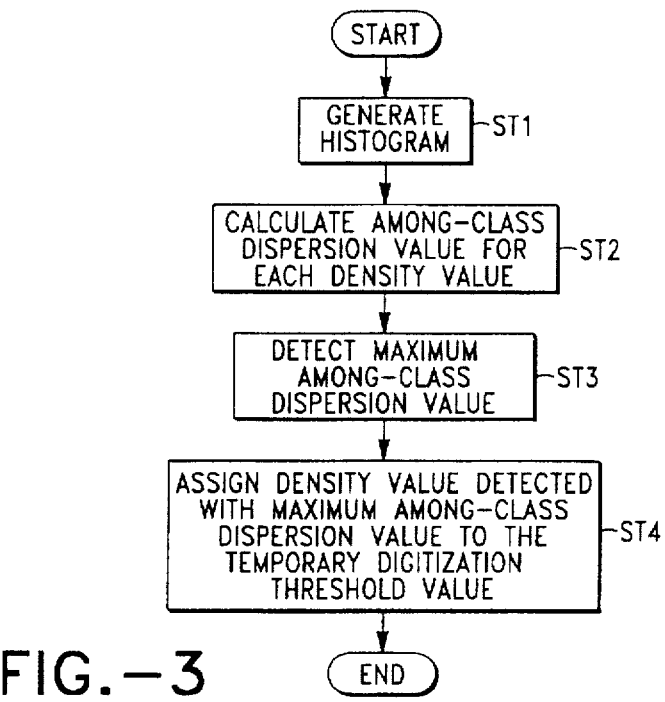
FIG. 3 is a flow chart used to describe the operation of the temporary digitization threshold value calculator according to the embodiment shown in FIG. 1.

The preferred and alternative embodiments of the present invention are described below with reference to the accompanying figures, of which FIG. 1 is a block diagram of the digitization signal generator in an image processing apparatus according to the preferred embodiment.

As shown in FIG. 1, an image processing apparatus according to a preferred embodiment of the present invention comprises image separator 1, temporary digitization threshold value calculator 2, subject presence evaluator 3, block information store 4, final digitization threshold value determiner 5, and digitizer 6.

Image separator 1 separates the input image (a gray level image) into plural blocks of M pixels horizontally by N pixels vertically (M and N being positive integers), and outputs the image signal by block unit to both temporary digitization threshold value calculator 2 and subject presence evaluator 3. For each image signal block received from image separator 1, temporary digitization threshold value calculator 2 then obtains the temporary digitization threshold value, and subject presence evaluator 3 determines whether subject text or objects are located in each block. Temporary digitization threshold value calculator 2 and subject presence evaluator 3 then output the respective results to block information store 4.

Block information store 4 stores the block information for each block. This block information includes the temporary digitization threshold value output from temporary digitization threshold value calculator 2, subject presence information generated by the subject presence evaluator 3, and the digitization threshold values supplied from final digitization threshold value determiner 5 as described below.

Final digitization threshold value determiner 5 determines the final digitization threshold value for each block using the information supplied from block information store 4. The digitizer 6 then digitizes the image signal of each block output from image separator 1 based on the digitization threshold value determined for each block by final digitization threshold value determiner 5. Digitizer 6 thus outputs the digitized image signal.

The temporary digitization threshold value calculator 2 further comprises, as shown in FIG. 2, histogram generator 21, among-class dispersion calculator 22, and among-class dispersion peak detector 23 for obtaining a digitization threshold value using the Otsu method described in the discussion of the prior art above and as well-known in the image processing art. In the present invention, however, the digitization threshold value obtained by the temporary digitization threshold value calculator 2 using the Otsu method is referred to and treated as an intermediate, temporary digitization threshold value which is a factor in determining the final digitization threshold value. The output from the peak detector 23 in the present invention is therefore a "temporary digitization threshold value."

This temporary digitization threshold value is obtained by the procedure shown in the flow chart in FIG. 3. Note that the process described in the flow chart in FIG. 3 is identical to that shown in FIG. 27 and described above, and further description thereof is thus omitted below. Note, however, that as stated above, the output from the Otsu method applied by the temporary digitization threshold value calculator 2 in the present invention is a temporary digitization threshold value. As a result, the density value corresponding to the detected peak among-class dispersion value and output by step ST4 in FIG. 3 is a temporary digitization threshold value rather than the final digitization threshold value obtained by the prior art as shown in FIG. 27.

Figure 4:
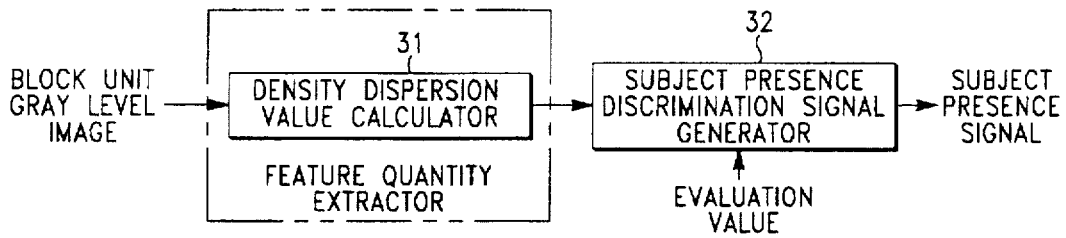
FIG. 4 is a more detailed block diagram of the subject presence evaluator according to the embodiment shown in FIG. 1.

Referring now to FIG. 4, the preferred subject presence evaluator 3 comprises a feature quantity extraction means for extracting a feature quantity of the gray level image input in block units, and a subject presence discrimination signal generator 32. The feature quantity extraction means is a density dispersion value calculator 31 for calculating a density dispersion value as the feature quantity in the present embodiment. This feature quantity (density dispersion value) is then supplied to the subject presence discrimination signal generator 32, which compares the feature quantity against a predetermined evaluation. If the density dispersion value is greater than the evaluation value, the subject presence discrimination signal generator 32 outputs a signal indicating that subject text or objects are present in the image block. If, however, the calculated density dispersion value is less than or equal to the evaluation value, the output signal indicates subject text or objects are not present in the image block.

Figure 5:
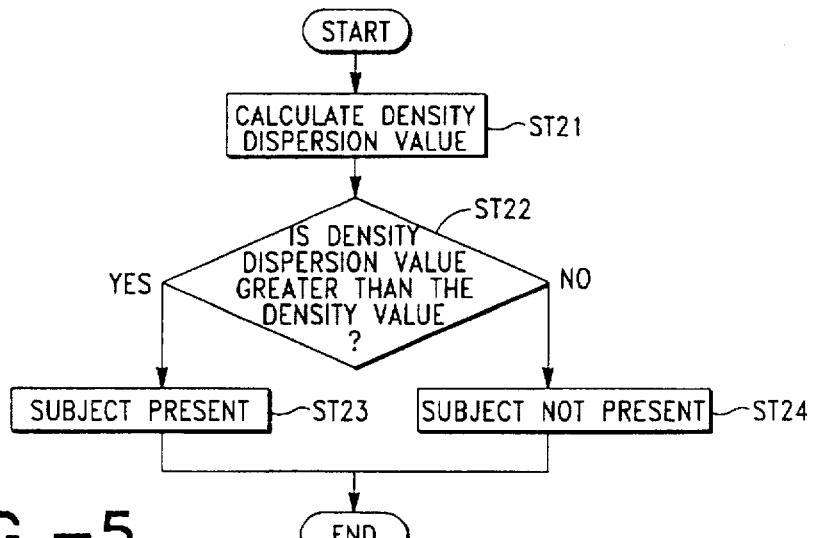
FIG. 5 is a flow chart used to describe the operation of the subject presence evaluator according to the embodiment shown in FIG. 1.

The operation of the subject presence evaluator 3 is described in more detail hereinbelow with reference to the flow chart of FIG. 5. Control begins at step ST21, when a block of gray level image information is relayed to the density dispersion value calculator 31. The density dispersion calculator then proceeds to calculate the density dispersion value from the density value of each pixel constituting the image block, as described hereinabove with reference to the description of the prior art and well known in the image processing arts. The density dispersion value obtained by the density dispersion value calculator 31 is then transferred to the subject presence discrimination signal generator 32. Control thereafter passes to step ST22, in which a determination is made by the subject presence discrimination signal generator 32 whether the calculated dispersion value exceeds a predetermined evaluation value or threshold preferably downloaded from an external source. If the calculated density dispersion value is greater than this evaluation value, control passes to step ST23 and the subject presence discrimination signal generator 32 generates a signal preferably to the block information store 4 shown in FIG. 4 indicating that subject text or objects are present in the image block (step ST23). However, if the density dispersion value is less than or equal to the evaluation value, control instead passes to step ST24 in which the subject presence discrimination signal generator 32 relays a signal preferably to block store 4 indicating that subject text or objects are not present in the image block.

The predetermined evaluation value used in this embodiment is similar to that discussed in reference to the prior art hereinabove. As is well-known in the art, this value should range from 1 to 3 in the case of 16 bit resolution gray-scale images. Here, the preferable value subrange extends from 1 to 2, with the midpoint, 1.5, being the most preferred value according to this embodiment. This suggested range is, however, not meant to be limiting, and it should become apparent to those ordinarily skilled in the art that the predetermined evaluation value may be chosen according to the specific image processing goals sought to be achieved.

Figure 6:
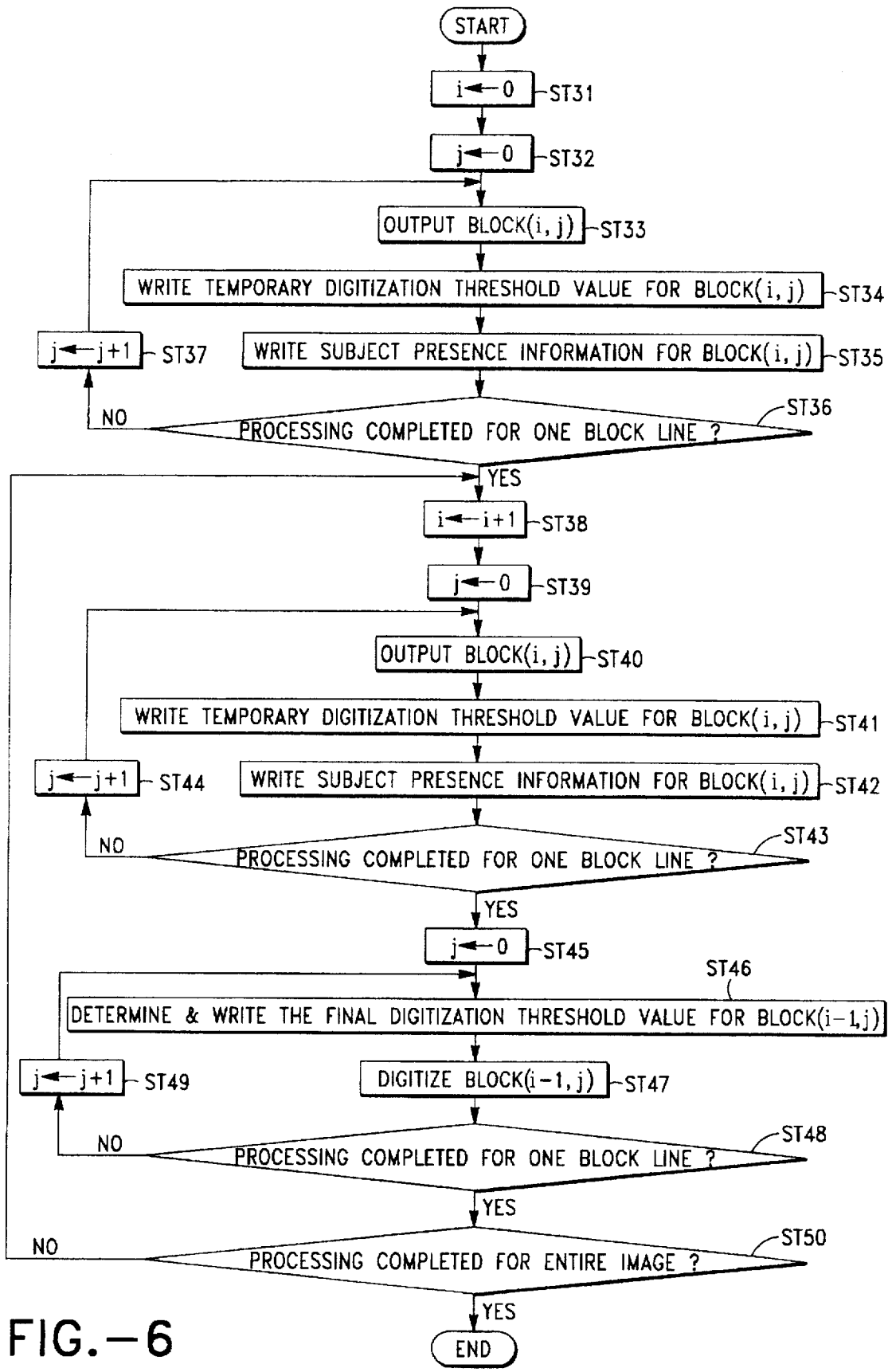
FIG. 6 is a flow chart used to describe the overall operation of the image processing method and apparatus according to the embodiment shown in FIG. 1.
Figure 7:
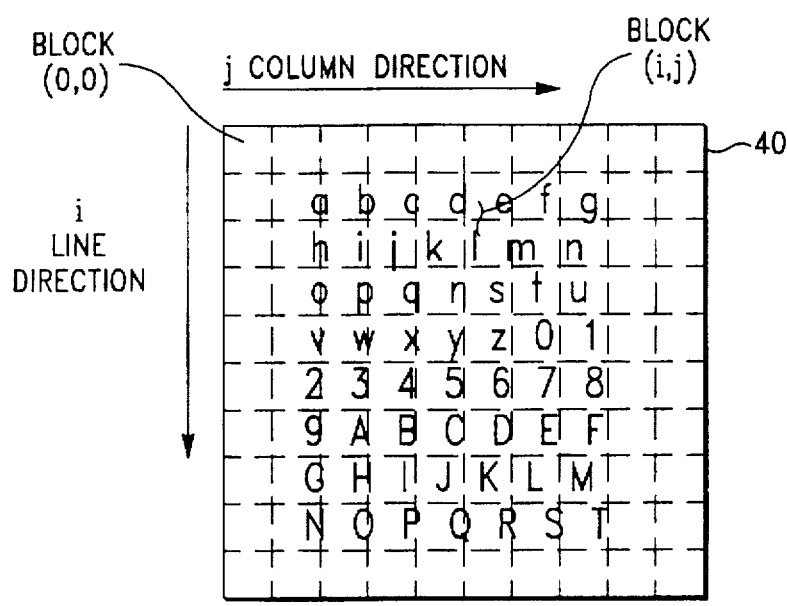
FIG. 7 illustrates an example input image.

The overall operation of the image processing apparatus shown in FIG. 1 according to the preferred embodiment can be described with reference to the flow chart of FIG. 6. However, it should to be noted that the input image 40 is separated by the image separator 1 into blocks of M pixels horizontally by N pixels vertically (M and N being positive integers) as shown in FIG. 7. (Each of the areas defined by the dashed lines in FIG. 7 represents one block.) The preferred process described in FIG. 6 is then executed on a per block unit basis. Individual blocks are further referenced by the block coordinates where (i,j) are the coordinates of block (i,j). For example, block (0,0) is the block at horizontal (line) block coordinate 0 and vertical (column) block coordinate 0, or more specifically for this embodiment, the block at the top left corner of the image as shown in FIG. 7.

Referring now to FIG. 6, specific coordinates are first substituted for the general coordinates of block (i,j) to define the block being processed (the target block). In this example, a coordinate value of 0 is assigned as an initial value for both i (step ST31) and j (step ST32). Control then passes to step ST33, in which image separator 1 extracts the target block (i,j) (which is block (0,0) for the first time the process is executed for an image), and outputs the image signal for the extracted block preferably in parallel to the temporary digitization threshold value calculator 2 and the subject presence evaluator 3.

Control then passes to step ST34. At step ST34, Temporary digitization threshold value calculator 2 calculates the temporary digitization threshold value for the target block (i,j) preferably according to the Otsu method described hereinabove, and writes the obtained value to the block information store 4. Control next passes to step ST35, in which the subject presence evaluator 3 detects whether subject information comprising text, symbols, objects or foreground graphics are in the target block (i,j), and similarly writes the result of this determination to block information store 4.

Control thereafter passes to step ST36. At step ST36, it is then determined whether initial processing and block information storage for one complete block line is completed. If not, control passes to step ST37 wherein the column coordinate j is incremented (step ST37), and then back to step ST33 in order process the subsequent block on the line.

If however, if ST36 the determination is made that in a fact a complete row or line of image data has been processed, control instead passes to step ST38, wherein the line coordinate i is incremented, subsequently the column coordinate j is reset to 0 (step ST39). The process executed by means of steps ST40 through ST44 is then iteratively executed in the same general manner as in steps ST33 through ST37, thus they need not be described further. Note, however, that the block line following that processed by steps ST33 through ST37 is processed by steps ST40 through ST44 because the line coordinate i has been incremented to i+1.

When, finally in step ST43, a determination is made that a complete block line has been preliminarily processed, control flows to step ST45. This signifies that two complete block lines have been processed, and the temporary digitization threshold value and the subject presence information for each block in the two lines has been written to the block information store 4. When processing two block lines has thus been completed, the column coordinate j is reset to 0 again. Control thereafter passes to step ST46, in which the final digitization threshold value determiner 5 determines the digitization threshold value for block (i−1,j), and writes this value to the block information store 4. Next, control passes to step ST47, in which block (i−1,j) is then digitized using the final digitization threshold value thus determined for that block.

Control thereafter passes to step ST48. At step ST48, a determination is made whether that one block line (i−1) has been completely processed (i.e. final digitization threshold values have been determined for every block on the line i−1). If it has not, the column coordinate j is incremented (step ST49) and the procedure from step ST46 is repeated for the subsequent block on the line. If, however, processing is completed for line i−1, control instead passes to step ST50.

At step ST50, a determination is made whether the every line constituting the input image has been completely processed. If, in step ST50, it is determined that the entire image has not been processed, step ST50 loops back to step ST38, to completely process the next line or row of image blocks constituting the image. If, however, in step S50, a determination is made that the entire image has been processed, the digitization process ends.

As thus described, the image processing method of the preferred embodiment obtains and writes to the block information store 4 a temporary digitization threshold value and subject presence information for each block in each complete block line. At the start of this procedure for any given complete image, the block information (temporary digitization threshold value and subject presence information) is first obtained for each block in the first two block lines. With block lines of block information stored in the block information store 4, the line coordinate i is then decremented to determine the final digitization threshold value for each block in that line by referencing the information stored in the block information store 4. As soon as the final digitization threshold value is written for a given block to the block information store 4, that block is digitized using that final digitization threshold value.

After each block in the first block line is thus digitized, the procedure thereafter determines the block information for each block in the next block line, similarly writing the temporary digitization threshold value and subject presence information for each block to the block information store 4. After this block information for the next line is obtained, the procedure again decrements the line coordinate i to determine the final digitization threshold value for each block in the preceding line by referencing the information stored in the block information store 4. Each block is also similarly digitized using the final digitization threshold value.

It is to be noted that while the preferred embodiment writes the temporary digitization threshold value and subject presence information to the block information store 4 for each block in one block line, and then steps back to determine the final digitization threshold value for each block in the preceding line, an ordinary skill in the art with knowledge of this disclosure will realize that the present invention is not so limited. For example, it is also possible to first obtain and write the temporary digitization threshold value and subject presence information for each block in all block lines to the block information store 4, and then return to the first block line to sequentially determine the final digitization threshold value for each block in all block lines. The block lines may also be processed in other combinations, as is known in the art.

The method applied by the final digitization threshold value determiner 5 to determine the final digitization threshold value for each block is described in greater detail below with reference to the flow charts in FIGS. 8–11.

Particularly, FIGS. 8, 9, 10 and 11 show the process for determining the final digitization threshold value for any given block. Note that the flow charts in FIGS. 8, 9, 10 and 11 show the continuous process executed to obtain the final digitization threshold value, and this process is divided into four flow charts for convenience of illustration only. Also, please note the following references and definitions used in FIGS. 8–11:

block (y, x): the target block for which the final digitization threshold value is to be determined;

TH.TEMP(i,j): the temporary digitization threshold value calculated by the temporary digitization threshold value calculator 2 for block (i,j);

Th.bi(i,j): the final digitization threshold value defined by the final digitization threshold value determiner 5 for block (i,j);

min: the smallest temporary digitization threshold value of all blocks in the reference range (defined in greater detail hereinbelow) in which subject text or object information is present;

flag1: a preferably Boolean flag indicating there is a block in the reference range in which subject(s) are present (the flag is set or ON when there is a block in which at least one subject character or object portion is present);

flag2: a preferably Boolean flag indicating whether the temporary digitization threshold values of the reference range blocks in which subjects are deemed present are all the same value or whether there are plural different values (the flag is set or ON when there are plural temporary digitization threshold values).

Figure 8:
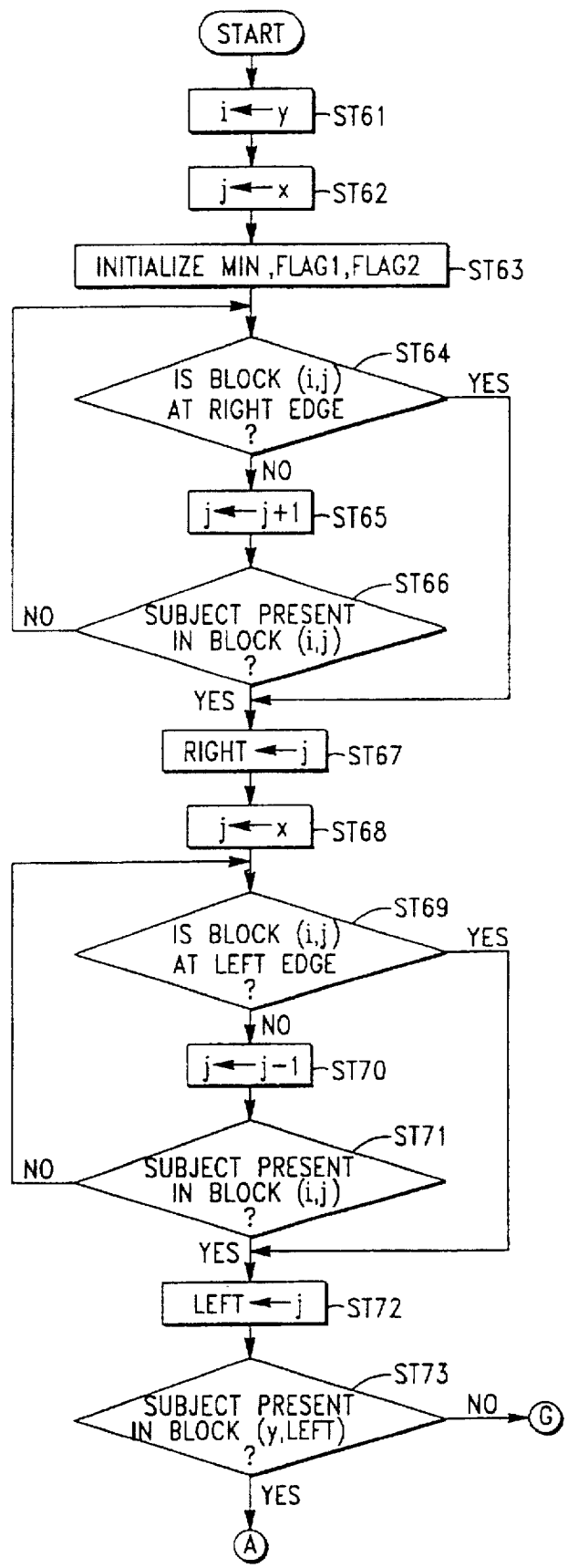
FIGS. 8–11 depict a flow chart used to describe the digitization threshold value determination process according to the embodiment shown in FIG. 1.

Referring now to FIG. 8, control for the final digitization threshold process according to the preferred embodiment begins by initializing the general coordinates of block (i,j) to the specific coordinates of the target block. In this case, coordinate y is assigned for the line coordinate i (step ST61), and x is assigned for the column coordinate j (step ST62). The minimum temporary digitization threshold value (min), flag1, and flag2 are then initialized (step ST63).

The next general procedure is to define the reference range for referencing adjacent block information (subject presence information, temporary digitization threshold value, and final digitization threshold value for each block). This is accomplished by first defining the reference range in the right horizontal direction from the target block (y, x) (step ST64–step ST67) as follows.

Control begins at step ST64. At this step, a determination is made whether the block (i,j) (starting at block (y, x)) is at the right edge of the input image. If it is, control passes to step ST67 in which the block (i,j) is defined as the right edge of the reference range, and the column coordinate j of the target block is substituted for the right coordinate of the right edge of the reference range in step ST67 (for example, if the column coordinate j of the target block is x, then right=j=x).

If, however, the target block is not at the right edge of the input image, control instead passes to step ST65 where the target block column coordinate j is incremented (e.g., j=x+1 in this example). Thereafter, control passes to step ST66, where a determination is made whether subject text, objects, or foreground graphics are present in the next block (i,j). If subject text or objects are present in the next block, this next block is defined as the right edge of the reference range, and the column coordinate j of that block is defined as the right coordinate of the right edge of the reference range (step ST67). If subject text or objects are not present in this next block, control instead passes to repeated from step ST64.

This procedure thus defines the right side of the reference range referenced to the target block (y, x). More specifically, if the target block (y, x) is at the right end of the block line, the target block defines the right side of the reference range. Otherwise, the first block to the right of the target block (y, x) in which subject are present defines the right side limit of the reference range, unless there is no block to the right of the target block (y, x) in which subject text or objects are present. In this case, the reference range ranges to the last block (the block at the right end) in the same block line as the target block (y, x) (i.e., ranges from the target block (y, x) to the right end of the same block line).

The left side limit of the reference range is decided by a similar process from steps ST68 to ST72. The first step is to reset the column coordinate j to the column coordinate x of the target block (y, x) in step ST68. The line coordinate i of the block line does not change at this time, and i therefore remains set to y as per step ST61. It is then determined at step ST69 whether the target block (i,j) (starting at block (y, x)) is at the left edge of the input image (step ST69). If it is, that block (i,j) is defined as the left edge of the reference range, and the column coordinate j of the target block is substituted for the left coordinate of the left edge of the reference range in step ST72 (for example, if the column coordinate j of the target block is x, then left=j=x).

If the target block is not at the left edge of the input image, then the target block column coordinate j is decremented (e.g., j=x−1 in this example) (step ST70), and it is determined (step ST71) whether subject text or objects are present in the next block (i,j). If subject text or objects are present in the next block, said block is defined as the left edge of the reference range, and the column coordinate j of that block is defined as the left coordinate of the left edge of the reference range (step ST72). If subject text or objects are not present in this next block, the procedure is repeated from step ST69.

This subroutine thus defines the left side of the reference range referenced to the target block (y, x). More specifically, if the target block (y, x) is at the left end of the block line, the target block defines the left side of the reference range. Otherwise, the first block to the left of the target block (y, x) in which subject text or objects are present defines the left side limit of the reference range, unless there is no block to the left of the target block (y, x) in which subject information is present. In this case, the reference range ranges to the first block (the block at the left end) in the same block line as the target block (y, x) (i.e., ranges from the target block (y, x) to the beginning of the same block line).

The right and left limits of the reference range on the same block line as the target block are thus determined by the process through step ST72 in FIG. 8.

Control next passes to step ST73. In the next series of steps, the block information for blocks within the defined reference range created hereinabove is interrogated. The content of the block information includes (a) whether there is a block in which subject text or objects are present in the reference range, (b) the minimum temporary digitization threshold value of the blocks in which subject text or objects are present, if there is at least one block in which subject text or objects are present in the reference range, and (c) if there is at least one block in which subject text or objects are present in the reference range, whether the temporary digitization threshold values of the blocks in which subject text or objects are present are two or more different values.

Note that the information indicating "whether the temporary digitization threshold values of the blocks in which subject text or objects are present are two or more different values" specifically indicates in this embodiment whether the temporary digitization threshold values of all blocks in which subject information is present are the same, or are not the same. For example, if the temporary digitization threshold value of each block in which subjects are present is "10", there is only one temporary digitization threshold value; if one block in which subject text or objects are present has a temporary digitization threshold value of "10" and another such block has a value of "8", then there are plural different temporary digitization threshold values in the reference range.

From step ST73 to step ST75 the block information for the block at block coordinate (y, left) is referenced (as described above, the block at coordinate (y, left) is the block at the left end of block line y in the reference range).

Figure 9:
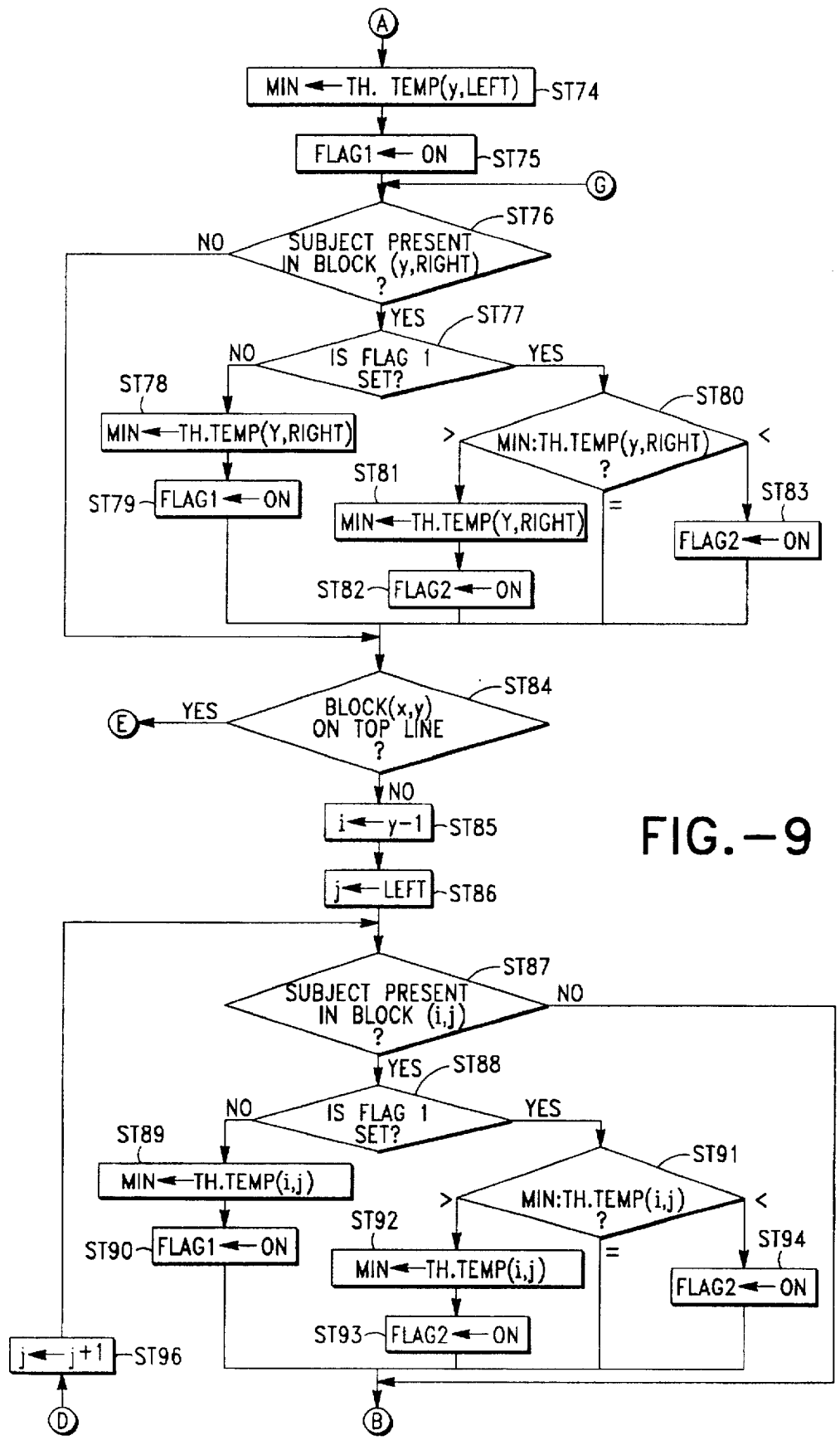

Turning now to FIGS. 8 and 9, at step ST73, it is determined whether subject text or objects are present in block (y,left). If it is, control passes to step ST74 and the temporary digitization threshold value TH.TEMP(y,left) of that block (y,left) is substituted for the minimum temporary digitization threshold value min. In other words, the temporary digitization threshold value TH.TEMP(y,left) of the first block to the left of the target block (y, x) in which subject text or objects are determined to be present is defined as the minimum temporary digitization threshold value min at that time (this assumes the first iteration where min has not been previously set).

Next, in step ST75, flag1 is switched on or set indicating that there is at least one block in the reference range in which subject imagery is present.

Next (referring below to the continuation of the flow chart in FIG. 9), the block information for the block at block coordinate (y, right) is referenced from step ST76 to step ST83 (as described above, the block at coordinate (y, right) is the block at the right end of block line y in the reference range). Control thereafter passes normally to step ST76.

If, however, in step ST73, it is determined that no subject information is contained within the left end block of the reference range, control instead jumps to step ST76 in order to interrogate the right end of the reference range.

At step ST76, it is determined whether subjects are present in block (y,right). If so, the status of flag1 is queried in step ST77. If flag1 is OFF (there is currently no block in the reference range E in which subject text or objects are detected to be present), control passes to step ST78 in which the temporary digitization threshold value TH.TEMP(y, right) of block (y,right) is substituted for the minimum temporary digitization threshold value min. In other words, if the subject has not been determined present in any block within the reference range to the left of the target block, the temporary digitization threshold value TH.TEMP(y,right) of the first block to the right of the target block (y, x) in which subject text or objects are determined to be present is defined as the minimum temporary digitization threshold value min. Control then passes to step ST79, wherein flag1 is set to indicate that there is at least one block in the reference range in which subject information is present. Control thereafter passes to step ST84 described below.

If, however, in step ST77, the determination is made that the flag1 has been already set (a block in which subject information is present has already been detected in the reference range), control instead progresses to step ST80. At step ST80, the previously registered minimum temporary digitization threshold value min is compared with the temporary digitization threshold value TH.TEMP(y,right) of the new reference range block in which subject text or objects are determined present. If this comparison determines that min>TH.TEMP(y,right), the minimum temporary digitization threshold value min is updated to the new temporary digitization threshold value TH.TEMP(y,right) (step ST81), and flag2 is set ON (step ST82). Control then passes normally to step ST84.

Thus, when the temporary digitization threshold values of the reference range blocks in which subject text or objects are determined to be present are different (there are two or more values), flag2 is set.

If, however, in step ST80, it is determined that the min value<TH.TEMP(y,right), the flag2 is simply set ON (step ST83), and control flows to step ST84. Also, if min= TH.TEMP(y,right), control flows directly to step ST84.

The same reference process described above is then executed for each block in the same block line as the target block in steps ST84 through ST96. Note that the block line on which the target block is present is described as Ly, the block line above (before) the target block line as Ly−1, and the block line below (following) the target block line as Ly+1.

The first step here is to decide whether the target block (y, x) is on the first line of the input image (step ST84). If not, y−1 is substituted for i (step ST85), and left is substituted for j (step ST86). Control then passes normally to step ST87.

Figure 10:
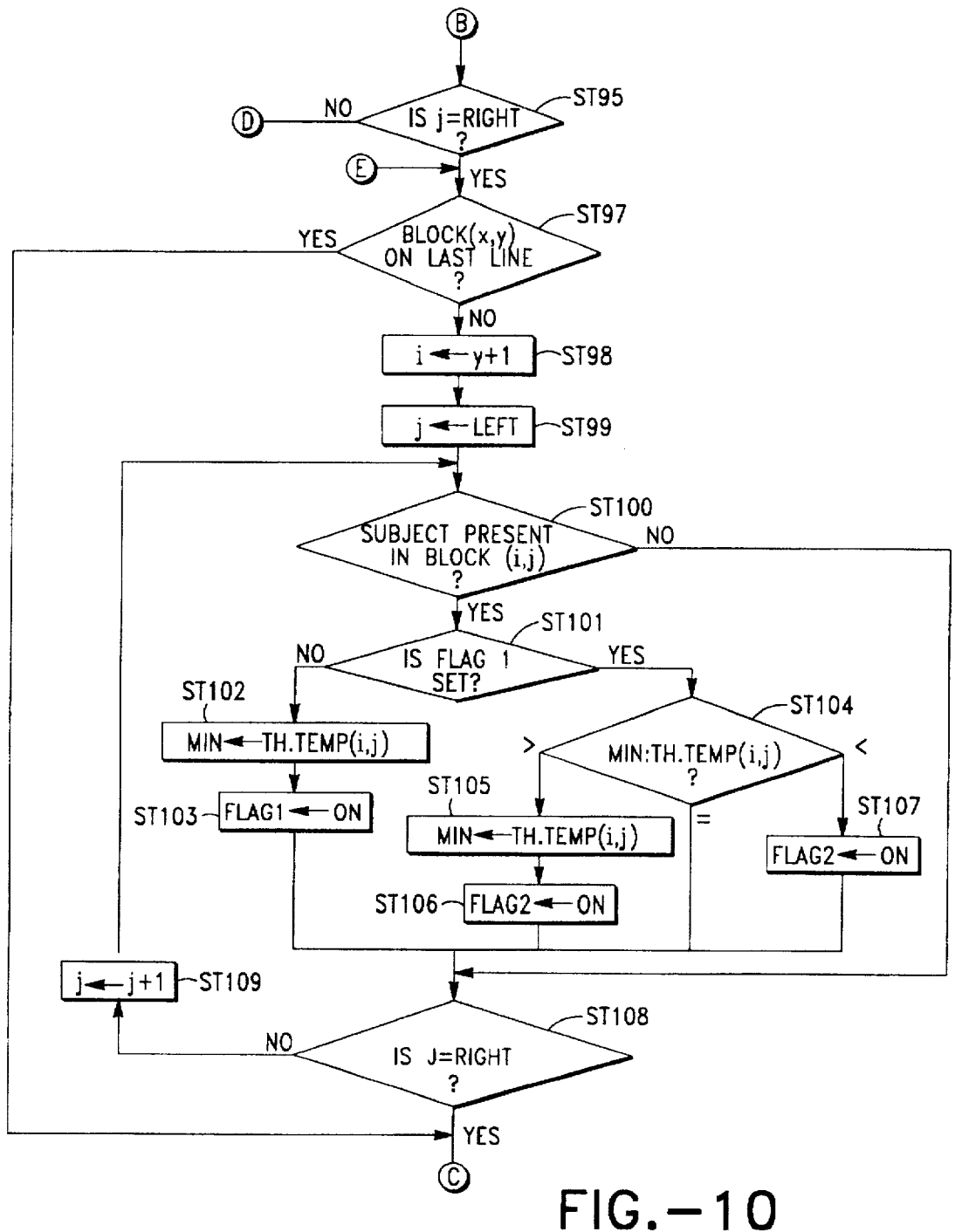

However, if at step ST84, the determination is made that block (x,y) is indeed on the top line, control instead falls through to step ST97 shown in FIG. 10.

At step ST87, it is determined whether subject data is present in block (i,j) (which at first is block (y−1,left. If it is, control passes to step ST88 in which flag1's status is queried. If flag1 is OFF, control passes to step ST89 and the temporary digitization threshold value TH.TEMP(i,j) of that block is substituted for the minimum temporary digitization threshold value min, and flag1 is set ON (step ST90). Control thereafter passes to step ST95 (FIG. 10).

If, however, in step ST88, it is determined that flag1 was ON (a block in which subject text or objects are present has already been detected in the reference range), control instead passes to step ST91, in which the previously registered minimum temporary digitization threshold value min is compared with the temporary digitization threshold value TH.TEMP(i,j) of the new reference range block in which the subjects are determined present. If this comparison determines that min>TH.TEMP(i,j), control thereafter passes to step ST92 where the minimum temporary digitization threshold value min is updated to the new temporary digitization threshold value TH.TEMP(i,j), and flag2 is set ON (step ST93).

Thus, when the temporary digitization threshold values of the reference range blocks in which subject data is determined to be present are different (i.e. there are two or more values), flag2 is set ON. If, however, the min value comparison step ST91 determines that min<TH.TEMP(i,j), flag2 is simply set ON (step ST94), and control flows to step ST95. If min=TH.TEMP(i,j), control flows directly to step ST95.

Next, with reference to FIGS. 9 and 10, to determine whether the currently referenced block is at the right edge of the reference range, the values of j and right are compared (step ST95). If j=right, the reference process for the block line Ly−1 above the target block line Ly is completed. However, if j<right, j is incremented in step ST96, and the process is repeated from step ST87.

This process is then similarly executed for the block line Ly+1 one line below the target block line Ly. This process is described below referring to the continuation of the flow chart in FIG. 10, steps ST97 to ST109.

The first step is to decide whether the target block (y, x) is on the last line of the input image (step ST97). If not, control passes to step y+1 is substituted for i (step ST98), and left is substituted for j (step ST99). Control thereafter passes to step ST100.

If, however, the determination is made in step ST97 that the target is block is in fact on the bottom line of the input image, control instead falls through to step ST110 (FIG. 11) described hereinbelow.

At step ST100, it is determined whether subject text or objects are present in block (i,j) (which at first is block (y+1,left)). If it is, control passes to step ST101 in which flag1 is checked. If flag1 is OFF, the temporary digitization threshold value TH.TEMP(i,j) of that block is substituted for the minimum temporary digitization threshold value min (step ST102), and flag1 is set ON (step ST103). Control thereafter proceeds normally to step ST108.

If, however, flag1 was ON in step ST101 (a block in which subject information is present has already been detected in the reference range), control instead passes to step ST104 in which the previously registered minimum temporary digitization threshold value min is compared with the temporary digitization threshold value TH.TEMP(i,j) of the new reference range block in which subject text or objects are determined present. If this comparison determines that min>TH.TEMP(i,j), the minimum temporary digitization threshold value min is updated to the new temporary digitization threshold value TH.TEMP(i,j) (step ST105), and flag2 is set ON (step ST106). Control then proceeds normally to step ST108.

Thus, when the temporary digitization threshold values of the reference range blocks in which subject text or objects are determined present are different (there are two or more values), flag2 is set ON. If the min value comparison determines that min<TH.TEMP(i,j), the flag2 is simply set ON (step ST94), and control flows to step ST108. If min= TH.TEMP(i,j), control flows directly to step ST108 (in this case there is only one unique temporary digitization threshold value, and flag2 is therefore not set ON).

Next, to determine whether the currently referenced block is at the right edge of the reference range, the values of j and right are compared (step ST108). If j=right, the reference process for the block line Ly+1 below the target block line Ly is completed. If j<right, j is incremented in step ST109, and the process is repeated from step ST100.

The content of flag1, flag2, and min in the above referencing process is described further below.

When flag1 is set ON, the subject has been determined present in at least one block in the reference range (not including the target block; note that "reference range blocks" below refers to all blocks in the reference range other than the target block); if OFF or clear, there are no blocks in the reference range in which subject text or objects are present.

When flag2 is ON, the temporary digitization threshold value is not the same in every reference range block in which subject text or objects are present, i.e., there are at least two unique temporary digitization threshold values. If flag2 is OFF, there is only one unique temporary digitization threshold value in the reference range blocks in which subject text or objects are present (there is only one reference range block in which subject text or objects are present, or the plural reference range blocks in which subject text or objects are present all have the same temporary digitization threshold value).

The min value is the smallest temporary digitization threshold value of all reference range blocks in which subject text or objects are present.

Figure 11:
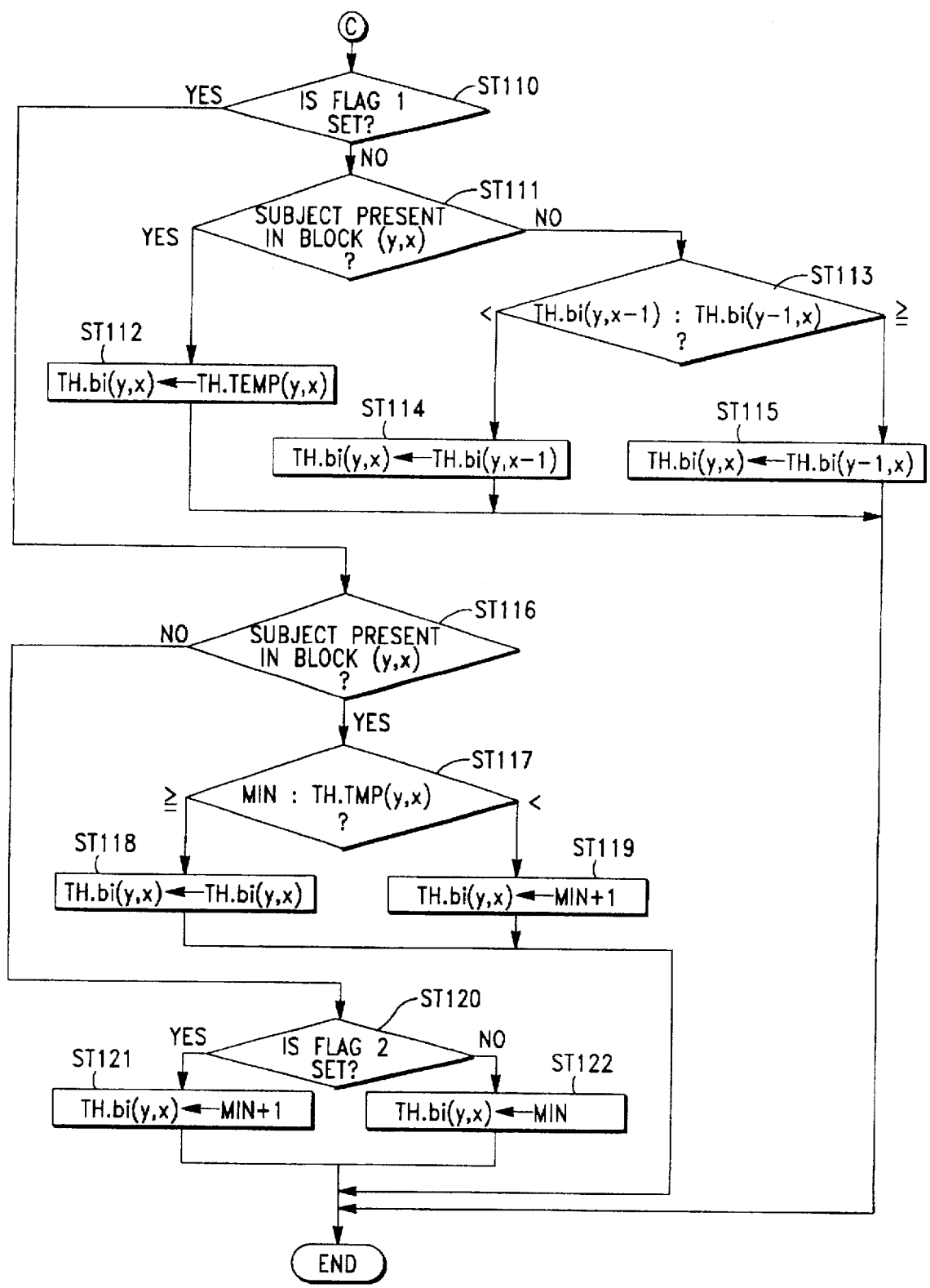

The process whereby the final digitization threshold value is determined is described below from step ST110 using the flow chart in FIG. 11. Note that the final digitization threshold value is determined using the subject presence information and the temporary digitization threshold value of the target block, flag1 and flag2, and the min value.

The first step is to check flag1 (step ST110). If flag1 is OFF (there are no reference range blocks in which subject text or objects are present), the subject presence information for the target block (y, x) is checked (step ST111). If, however, in step S110 it is determined that flag 1 has been set, control instead passes to step ST116 below.

In step ST111, if subject text or objects are found to be present in the target block, the temporary digitization threshold value TH.TEMP(y,x) is defined to be the final digitization threshold value Th.bi(y,x) of target block (y, x) (step ST112). Specifically, because there are no blocks in the reference range in which subject text or objects are present, the TH.TEMP(y,x) is defined to be the final digitization threshold value being calculated, and the process terminates.

On the other hand, if subject text or objects are not present in the target block (y, x), control instead passes to step ST113 where the final digitization threshold values (Th.bi(y,x−1) and Th.bi(y−1,x)) of the blocks above (block(y,x−1)) and beside (block(y−1,x), or left in this example) the target block are compared. Note that in this case subject text or objects are not present in the reference range or the target block. To determine the final digitization threshold value of the target block, the final digitization threshold values already determined for plural other blocks (two in this example) are referenced and compared, and the smallest of the values is used as the final digitization threshold value for the current target block.

Th.bi(y,x−1) is therefore defined as the final digitization threshold value Th.bi(y,x) being obtained for the target block (step ST114) if it is determined in step ST113 that Th.bi(y, x−1)<Th.bi(y−1,x), and the process stops.

If Th.bi(y,x−1)≧Th.bi(y−1,x), control passes to step ST115 in which Th.bi(y−1,x) is defined as the final digitization threshold value Th.bi(y,x) being obtained for the target block and the process stops.

If the target block (y, x) is the block at the left end of the first (top) line in the input image, there can be no block for which the final digitization threshold value has been determined. A predefined value (typically a median value such as 8 for an input image with 16 gray levels) is therefore used as the final digitization threshold value for that block.

As stated above, if in step ST110 flag1 is ON (there is a reference range block in which subject text or objects are present), the subject presence information for the target block (y, x) is checked in step ST116.

If subject text or objects are present in the target block, control passes from step ST116 to ST117 in which the temporary digitization threshold value TH.TEMP(y,x) of the target block is compared with the previously determined minimum temporary digitization threshold value min (step ST117). If min≧TH.TEMP(y,x), the temporary value TH.TEMP(y,x) is defined to be the final digitization threshold value Th.bi(y,x) of target block (y, x) (step ST118). If, however, it is determined in step ST117 that min<TH.TEMP (y,x), the value min+1 is used for the final value Th.bi(y,x) of target block (y, x) (step ST119). The value of +1 used to increase the min value will be described hereinbelow. In either case, the final digitization threshold has been determined and processing successfully terminates.

As described above, when the temporary digitization threshold value TH.TEMP(y,x) of the target block is greater than the previously determined minimum temporary digitization threshold value min, i.e., min<TH.TEMP(y,x), the sum (min+1) is defined to be the final digitization threshold value of the target block (y, x) even though the previously-determined minimum temporary digitization threshold value min is normally used as the digitization threshold value of the target block.

This is because if the minimum temporary digitization threshold value min obtained for the reference range is directly used as the final digitization threshold value of the target block, gray levels tending towards the black side may be excessively removed with the characters becoming too thin or light (depending upon the content of the subject (letters) in the target block). In other words, by increasing the minimum temporary digitization threshold value min obtained in the reference range by +1, the digitization threshold value of the target block can be shifted slightly towards the white side, and elimination of shades on the black side can be suppressed. This is described in greater detail below with reference to example FIGS. 12A–12C hereinbelow.

Figure 12A:
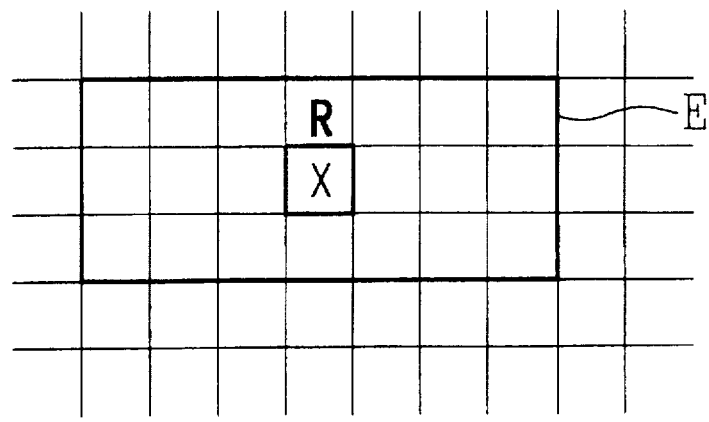
FIGS. 12A–12C illustrate a first example input image and corresponding digitization threshold information compiled in response thereto according to the embodiment shown in FIG. 1.
Figure 12B:
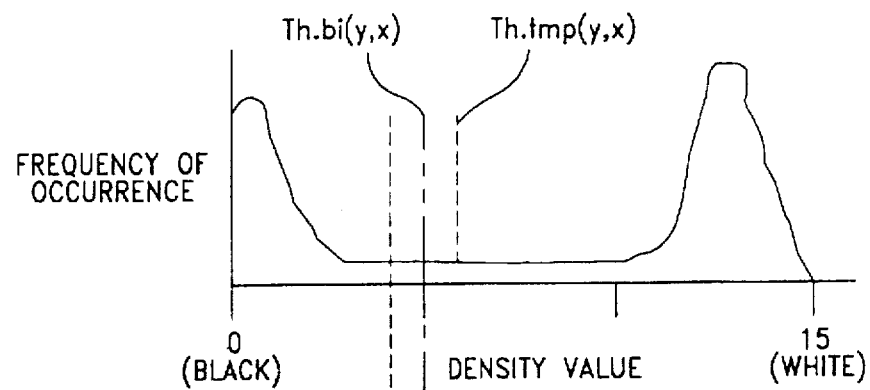
Figure 12C:
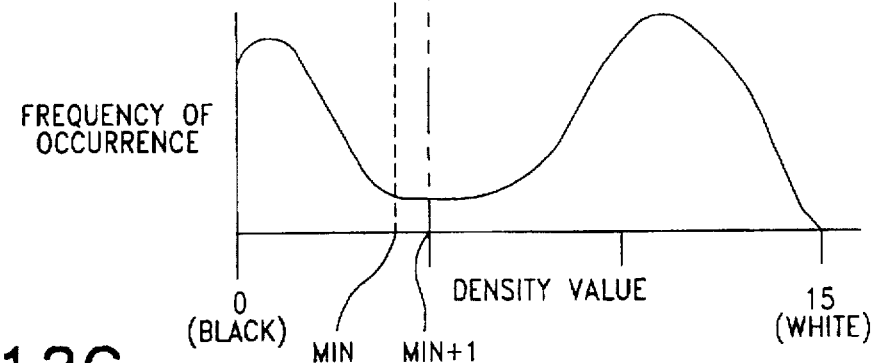

Referring to FIG. 12A, it is assumed in the following discussion that the character "X" is the subject present in the target block; the approximated density histogram for "X" is shown in FIG. 12B. Note that "X" has relatively few black line components. It is further assumed that the minimum temporary digitization threshold value min obtained for the reference range was obtained from the density histogram (FIG. 12C) for a relatively complex character containing a relatively large black line component (for example, the bold font letter "R" shown in FIG. 12 (a)). If the temporary digitization threshold value TH.TEMP(y,x) of this target block is compared with the minimum temporary digitization threshold value min of the reference range thus obtained, and the min value of the reference range is therefore defined as the final digitization threshold value Th.bi(y,x) of the target block, the digitization threshold value represents a value whereby too much black is removed when applied to the current target block. If the target block is then digitized using this digitization threshold value, the letter "X" may become too blurred or light.

To prevent this under such circumstances, a predetermined value (+1 in this example) is added to the minimum temporary digitization threshold value min obtained for the reference range, and this adjusted value min+1 is used as the final digitization threshold value Th.bi(y,x) of the target block. As a result, the elimination of black is reduced, and blurring or fading of letters such as "a" with relatively little black content can be prevented.

It is to be note that while the present embodiment has been described using a value of +1 added to the min value, the invention shall not be so limited and other values can obviously be used. Specifically, an increment of 1 (or another appropriate value) may be appropriate if the input image has 16 gray levels ranging from 0–15 as in the case described with reference to FIG. 12, but if the input image contains 256 levels, for example, a value appropriate to the number of levels shall be set.

Referring again to FIG. 11, when subject text or objects are determined not present in the target block (y, x) (step ST116), flag2 is checked (step ST120). If flag2 is ON (there are two or more different temporary digitization threshold values in the reference range), min+1 is defined as the final digitization threshold value Th.bi(y,x) of the target block (step 121); if flag2 is OFF, min is defined as Th.bi(y,x) of the target block (step 122). Thereafter, processing ends with the final digitization values obtained.

It is to be noted that min+1 is defined as the final digitization threshold value Th.bi(y,x) of the target block when flag2 is ON because flag2 is ON when different characters (such as "X" and "R" in the above example) are in the reference range, and the temporary digitization threshold values for those characters differ. It is therefore preferable in such cases to shift the final digitization threshold value slightly to the white side and suppress pixel elimination on the black side. On the other hand, all temporary digitization threshold values detected in the reference range are the same value when flag2 is OFF. When these values are the same, the characters from which these values are obtained can also be concluded to be similar, and the minimum temporary digitization threshold value min can be used as the final digitization threshold value Th.bi(y,x) without adverse effects.

The final digitization threshold value Th.bi(y,x) of the target block (y, x) is thus determined by mean of the preceding process.

The appropriateness of the preceding method for determining the digitization threshold value is described below with reference to additional specific examples.

Figure 13A:
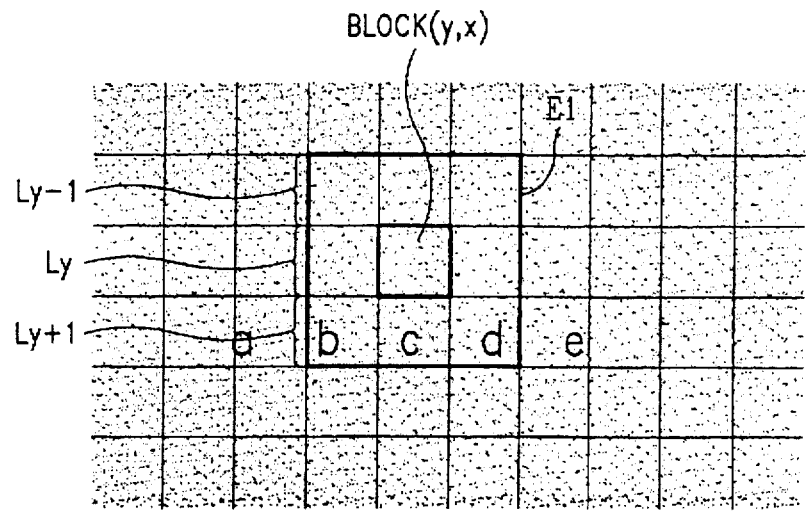
FIGS. 13A–13C illustrate a second example input image and corresponding digitization threshold information compiled in response thereto according to the embodiment shown in FIG. 1.

The next example considered is shown in FIG. 13A. The image in FIG. 13A contains plural letters, specifically the roman characters "a", "b, "c", "d", and "e", written in black against an uneven background of intermediate tones. The target block for which the digitization threshold value is to be determined is block (y, x). Note that the target block (y, x) in this case contains only the background, and contains no part of any letter. The input image is further assumed to be a gray level image of sixteen levels ranging in density from "0" (black) to "15" (white); this is also the case with the images shown in FIGS. 14A and 15A.

Figure 13B:
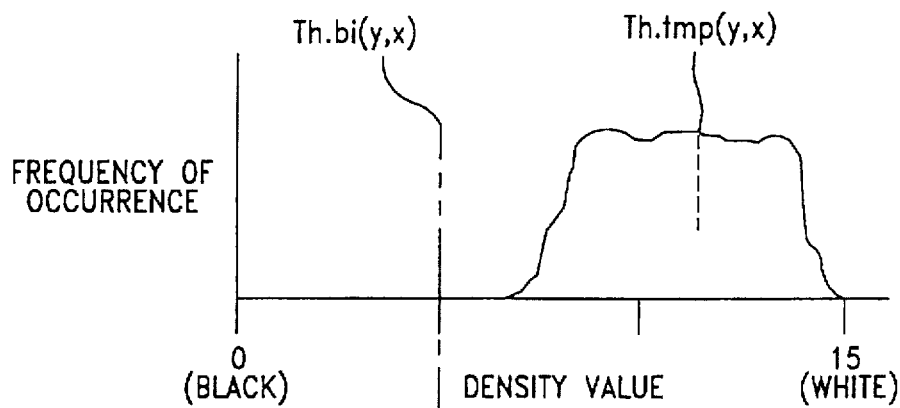

The density histogram of the image shown in FIG. 13A is approximately represented in FIG. 13B. A false determination that subject text or objects are present in the target block can easily occur in this case because the density dispersion value is not sufficiently small. It is therefore further assumed that the subject was falsely determined to be present in the target block in this example. As described above with reference to FIG. 4, subject text or objects are determined to be present by comparing the density dispersion value with an evaluation value, and determining the subject to be present when the density dispersion value is greater than the evaluation value.

The temporary digitization threshold value TH.TEMP(y, x) of target block (y, x) is shown as the dotted line in FIG. 13B intersecting the probability of occurrence curve, and the final digitization threshold value Th.bi(y,x) is determined for this block as follows.

First, the final digitization threshold value determiner 5 defines the reference range according to the method described above. Subject text or objects are falsely determined to be present in the blocks adjacent to the target block on the right and left sides thereof, and the horizontal (block line) limits of the reference range are therefore determined to be at coordinates x−1 and x+1. The blocks vertically (column direction) above (Ly−1) and below (Ly +1) the block line Ly of the target block (y, x) are also referenced, and the reference range E1 is therefore defined to be the area within the heavy black line in FIG. 13A.

The density histograms for each block in the block line of the target block (y, x) and the line thereabove (Ly−1) are virtually identical as shown in FIG. 13B. Subject text or objects are determined to be present in each of these blocks, and the temporary digitization threshold values of these blocks are substantially identical to the temporary digitization threshold value TH.TEMP(y,x) of the target block (y, x).

Figure 13C:
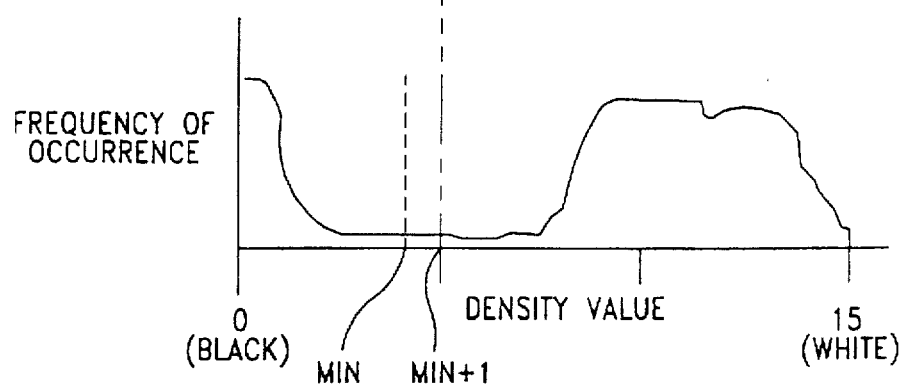

Each of the three blocks in the line (Ly+1) below the target block line Ly contains both the uneven background and a letter. The approximate density histograms for each block are also substantially the same (FIG. 13C), and the temporary digitization threshold value is as indicated by the leftmost dotted line in FIG. 13C. This temporary digitization threshold value is a value whereby it is simple to eliminate the background and leave only the letters.

As a result, the temporary digitization threshold value of each of the three blocks in block line Ly+1 is equal to the minimum temporary digitization threshold value min of the reference range E1; flag1 is ON because there is at least one block in the reference range in which subject text or objects are present; and flag2 is also ON because there are at least two different temporary digitization threshold values in the reference range E1. As described with respect to the flow chart portion depicted in FIG. 11, the final digitization threshold value of the target block is min+1 (indicated by the dot-dash line intersecting both FIGS. 13B and 13C).

It is therefore possible, even though subject text or objects are falsely determined to be present in the target block, to set a digitization threshold value for the target block whereby the background can be removed. It should be noted that with the second example of the prior art described above, the density value corresponding to the among-class dispersion value is defined as the final digitization threshold value when subject text or objects are determined present. As a result, the digitization threshold value does not completely remove the background, which then remains as noise after the image is digitized, as illustrated in prior art FIG. 28.

A further example illustrating final digitization threshold value determination according to the preferred embodiment is shown in FIG. 14A. The image in FIG. 14A contains plural letters, specifically the characters "a", "b", "c", "d", and "e", written in black against a white background. The target block for which the digitization threshold value is to be determined is block (y, x). Note that the target block (y, x) in this case contains the background and one part of the letter "c" contained primarily in the block below (in line Ly+1).

The approximated density histogram of the image shown in FIG. 14A is shown in FIG. 14B. A false determination that subject text or objects are not present in the target block can easily occur in this case because the density dispersion value is not sufficiently large. It is therefore further assumed that the subject was falsely determined to not be present in the target block, as well as in every other block on the target block line, in this example.

The object, therefore, is to determine an appropriate final digitization threshold value for this target block. The first step is to define the reference range. Because subject text or objects are determined not present in any of the blocks on the same line as the target block, the horizontal (line direction) limits of the reference range are the left and right edges of the input image. The column direction limits of the reference range are the block lines above (Ly−1) and below (Ly+1) the target block line Ly. The resulting reference range E2 is therefore as shown in FIG. 14A. Note that while the actual limits of the reference range are the edges of the input image, only part of the full range is shown in FIG. 14A.

As will be known from FIG. 14A, only background is present in the blocks of line Ly−1, but the subject ("a", "b", "c", etc.) is present in some of the blocks on the next line Ly+1.

The density histograms of the blocks in which subject text or objects are present are therefore substantially as shown in FIG. 14C). The density dispersion values are sufficiently great, subject text or objects are determined present, and the temporary digitization threshold value (the dotted line in FIG. 14 C corresponding to min) will remove the background and leave only the letters with substantially the same results in each block. Therefore, the minimum temporary digitization threshold value min of the blocks in which subject text or objects are present in the reference range E2 will be the temporary digitization threshold value of one of the blocks in which the subject (letter) is present. Also, flag1 is ON; and flag2 will be OFF if the temporary digitization threshold values of each of the blocks in which subject text or objects are present in the reference range are the same, and ON if the values are different. As described with respect to the flow chart portion in FIG. 11, the final digitization threshold value Th.bi(y,x) of the target block is min if flag2 is OFF, and is min +1 if flag2 is ON.

It is therefore possible, even though subject text or objects are falsely determined to not be present in the target block, to set a digitization threshold value for the target block whereby the background can be removed. It should be noted that with the prior art described above, the digitization threshold value can be selectively set to either "0" or "255" when it is determined that subject text or objects are not present, and when the digitization threshold value is "0", the subject will be eliminated even though it is actually present in the target block as in this example.

Figure 15A:
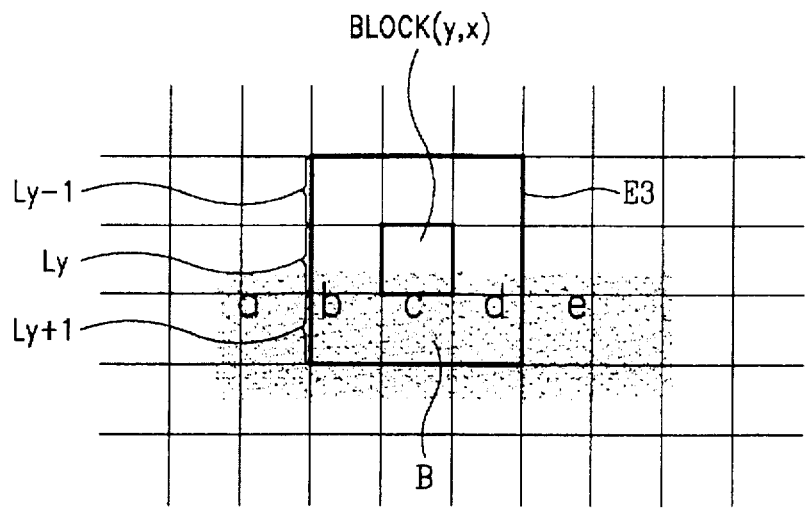
FIGS. 15A–15C illustrate a fourth example input image and corresponding digitization threshold information compiled in response thereto according to the embodiment shown in FIG. 1.
Figure 15B:
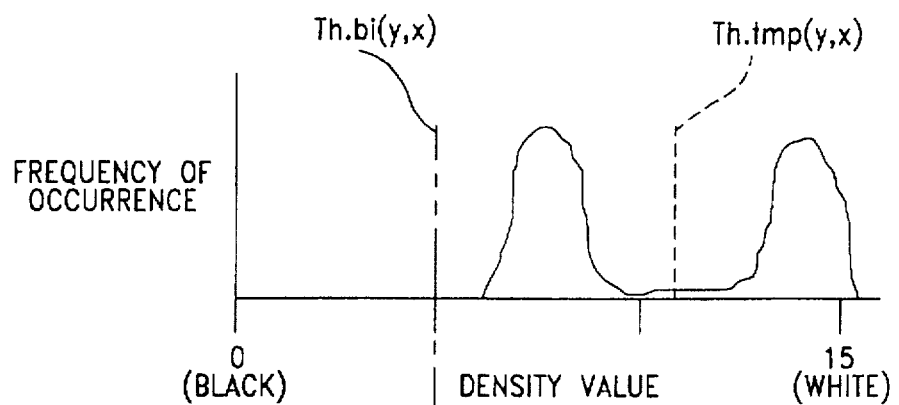

A third example is shown in FIG. 15A. The image in FIG. 15A contains plural letters, specifically the characters "a", "b", "c", "d", and "e", with only the area around the text shaded. The target block for which the digitization threshold value is to be determined is block (y, x), and contains in this case the border between the backgrounds of two different shades. The density histogram of this target block is shown in FIG. 15B. Subject text or objects are also falsely determined present because the dispersion value is sufficiently high due to the shaded part of the background, which should be removed. The object, therefore, is to determine the best-case final digitization threshold value for this target block.

The first step is to define the reference range. Subject text or objects are falsely determined to be present in the blocks adjacent to the target block on the right and left sides thereof, and the horizontal (block line) limits of the reference range are therefore determined to be at coordinates x−1 and x+1. The column direction limits of the reference range are the block lines above (Ly−1) and below (Ly+1) the target block line Ly. The resulting reference range E3 is therefore as shown by the heavy black lines in FIG. 15A. Note that there is only white background in the blocks on block line Ly−1 above the target block line Ly, and the blocks on line Ly+1 below the target block line Ly contain both the subject ("b", "c", "d") and the shaded background.

The density histograms for the target block (y, x) and the right and left blocks adjacent thereto are shown in FIG. 15b. The temporary digitization threshold values are also the same, as indicated by the dotted line between the two curve peaks of FIG. 15B. If this temporary digitization threshold value were used to digitize the image blocks, however, the white background would be removed and the shaded background would be left.

Figure 15C:
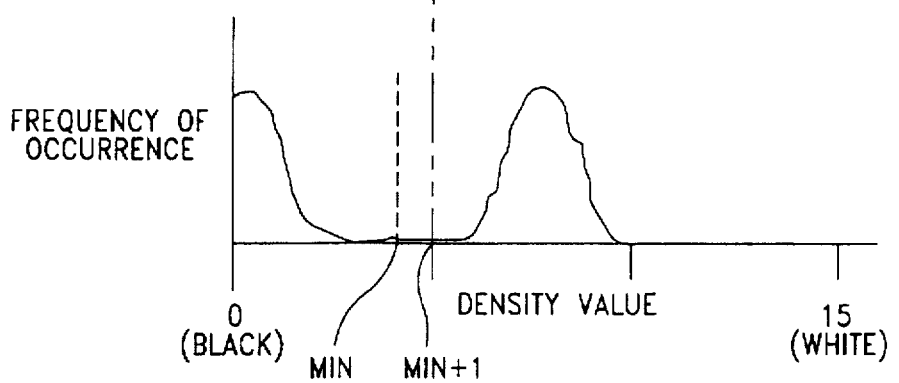

The blocks in block line Ly+1, however, contain both black letters (subjects) and the shaded background. The density histograms for these blocks are therefore as shown in FIG. 15C, and the temporary digitization threshold values are as indicated by the dotted line labelled min. This temporary digitization threshold value will eliminate the background and leave the subject.

The minimum temporary digitization threshold value min of the reference range E3 blocks in which subject text or objects are present will therefore be the temporary digitization threshold value of one of the blocks on line Ly+1; flag1 will also be ON, and flag2 will be ON. As a result, the digitization threshold value of the target block (y, x) will be min+1 as indicated by the dot-dash line intersecting FIGS. 15A and 15B, and it will be possible to remove the shaded background and leave the subject in the target block. Note, again, that with the conventional techniques of the prior art described above, the density value corresponding to the among-class dispersion value is defined as the final digitization threshold value when subject text or objects are determined present. As a result, the digitization threshold value does not completely remove the background, which then remains as noise after the image is digitized, as shown in prior art FIG. 29.

When determining the reference range limits (e.g., reference ranges E1, E2, and E3 above) according to the present invention, the limits in the horizontal (line) direction based on the target block range to the first block in which subject text or objects are present, and range to the edge of the input image when subject text or objects are not present. This is described in further detail below with reference to FIG. 16.

Figure 16:
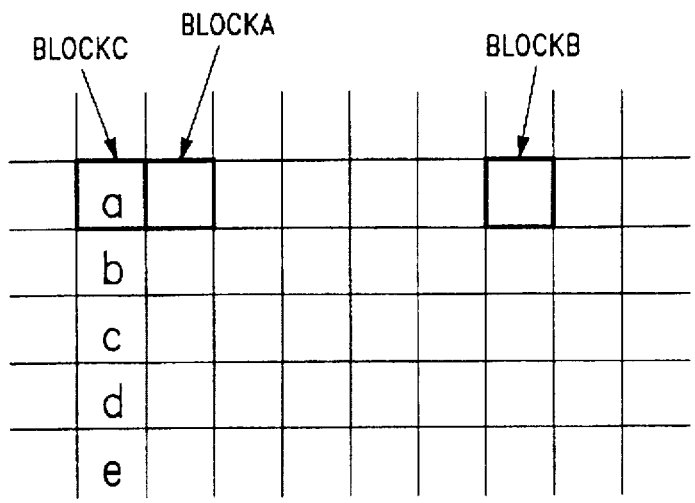
FIG. 16 is used to describe determination of the reference range according to the embodiment shown in FIG. 1.

Referring to FIG. 16, the target block is BLOCKA, and it is determined that subject text or objects are not present in the target block. As a result, it is not possible to determine whether BLOCKA should be black or white, or whether the determination that subject text or objects are not present in BLOCKA is correct, using only the block information for BLOCKA.. It is therefore necessary to reference the block information for the surrounding blocks.

The present invention determines the line direction limits of the reference range by sequentially checking the subject presence information for each block on the same line as the target block to be digitized starting from the block adjacent to the target block. If a block in which subject text or objects are present is found, that block is defined as the line direction limit of the reference range in that direction; if no block in which subject text or objects are present is found to the end of the line, the last block in the line is defined as the line direction limit of the reference range in that direction.

In the example shown in FIG. 16, the line limit to the left of the target block is therefore BLOCKC, and the line limit to the right of the target block is the edge of the image if no block in which subject text or objects are present is found.

The same reference range results will be obtained when BLOCKB in FIG. 16 is the target block: the line limit to the left of the target block will be BLOCKC, and the line limit to the right of the target block will be the edge of the image if no block in which subject text or objects are present is found.

The size of the reference range is therefore variable: if BLOCKA in FIG. 16 is the target block, the left limit is the BLOCKC immediately adjacent to the target block; if BLOCKB is the target block, the left limit is not found until the block in which subject text or objects are present is found six blocks from the target block.

Why the line direction limits of the reference range are thus variable in the present invention is described below.

If the line direction limits of the reference range are fixed at, for example, two blocks from the target block in each direction, there will be no blocks within the reference range in which subject text or objects are present when BLOCKB (FIG. 16), for example, is the target block, and a reference digitization threshold value cannot be obtained. The line direction limits of the reference range are also variable so that the reference range width can be increased to increase the probability of finding a block in which subject text or objects are present. However, when there is a block in which subject text or objects are present immediately adjacent to the target block, extending the reference range beyond this adjacent block simply wastes processing time.

For example, if BLOCKA is the target block and the reference range contains ten blocks to the right and left of the target block and a fixed number (assume 10 in each direction) of blocks will be compared, the reference range will continue out to ten blocks from the target block even though subject text or objects are present in the adjacent block, and unnecessary processing is executed. To avoid these problems, the present invention defines a reference range of variable limits in the horizontal (line) direction referenced to the target block.

It is therefore always possible to define the smallest possible reference range required to set the digitization threshold value, the digitization threshold value can be appropriately set, and the required processing time can be minimized.

When determining the digitization threshold value of the target block in the above embodiment, it is determined whether subject text or objects are present in the target block. When subject text or objects are present, the minimum temporary digitization threshold value min in the reference range and the temporary digitization threshold value of the target block are compared, and the lower value is defined as the digitization threshold value being obtained. When subject text or objects are not present, a logical comparison operation obtains the smallest temporary digitization threshold value in the reference range, and this minimum value is defined as the digitization threshold value being sought.

The present invention shall not be limited to this method, however. It is also possible, for example, to obtain the maximum and median values by a similar logic operation, and determine the final digitization threshold value based on these maximum and median values.

The present invention is also not limited to logic operations, and it is also possible to use an arithmetic operation to determine the final digitization threshold value. For example, the mean of the temporary digitization threshold values in the reference range, including the target block, may be obtained, and the final digitization threshold value of the target block determined based on this mean value.

It is also possible to determine the best-case digitization threshold value by arithmetically applying a particular value determined according to the conditions to the value obtained by a logic or arithmetic operation as described above.

Moreover, there are cases in which a minimum value is the best digitization threshold value depending upon the image conditions, there are cases in which the maximum and median values are best used, and there are cases in which the arithmetic mean is best used. It is also possible to select the method for determining the digitization threshold value so that the value best suited as the digitization threshold value can be selected according to the image conditions.

It should also be noted that while the Otsu method is used as the means for obtaining the temporary digitization threshold value in the preceding embodiment of the invention, an ordinary skill in the relevant art should recognize that the temporary digitization threshold value can also be obtained by methods other than the Otsu method. An alternative means of obtaining the temporary digitization threshold value is therefore described below.

Figure 17:
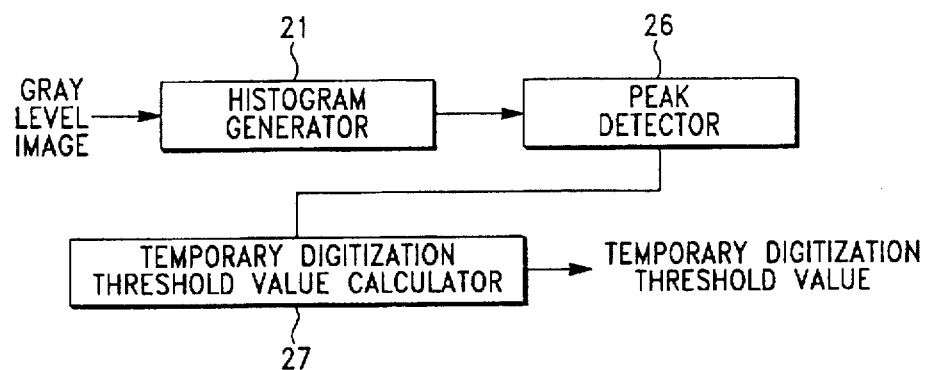
FIG. 17 is a block diagram of an alternative temporary digitization threshold value calculator according to the present invention.

FIG. 17 is a basic block diagram of this alternative method and apparatus, which comprises a histogram generator 21, peak detector 26, and temporary digitization threshold value calculator 27. The operation of this image processing apparatus is described below.

The peak detector 26 detects the required density peaks from the density histograms generated by the histogram generator 21, but does not simply extract those peaks appearing as the maximum wave peaks within a particular period. More specifically, each peak is tested against particular conditions, and any peak that does not meet the conditions is not considered a "peak." The peak detector 26 therefore only detects those peaks required to obtain the temporary digitization threshold value. This process is described below with reference to FIGS. 18 and 19.

Figure 18:
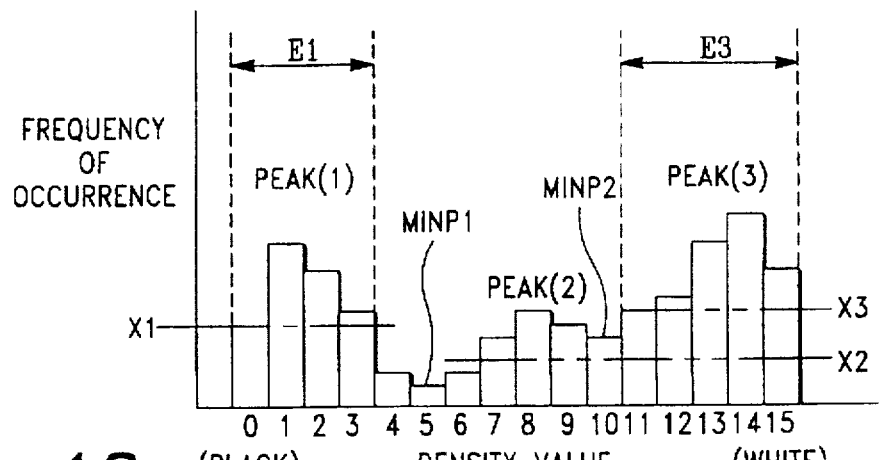
FIG. 18 is a density histogram used to describe the operation of the temporary digitization threshold value calculator shown in FIG. 17.

FIG. 18 is a density histogram generated by the histogram generator 21. This histogram generator 21 is identical to that described in the preceding embodiment, but a bar graph is used here to represent the frequency of occurrence of each density value and simplify the following description. Note, further, that there are three peak candidates, peaks (1), (2), and (3), in the graph. Which of these peak candidates is the required peak for obtaining the is obtained by the method shown in the flow chart in FIG. 19.

Figure 19:
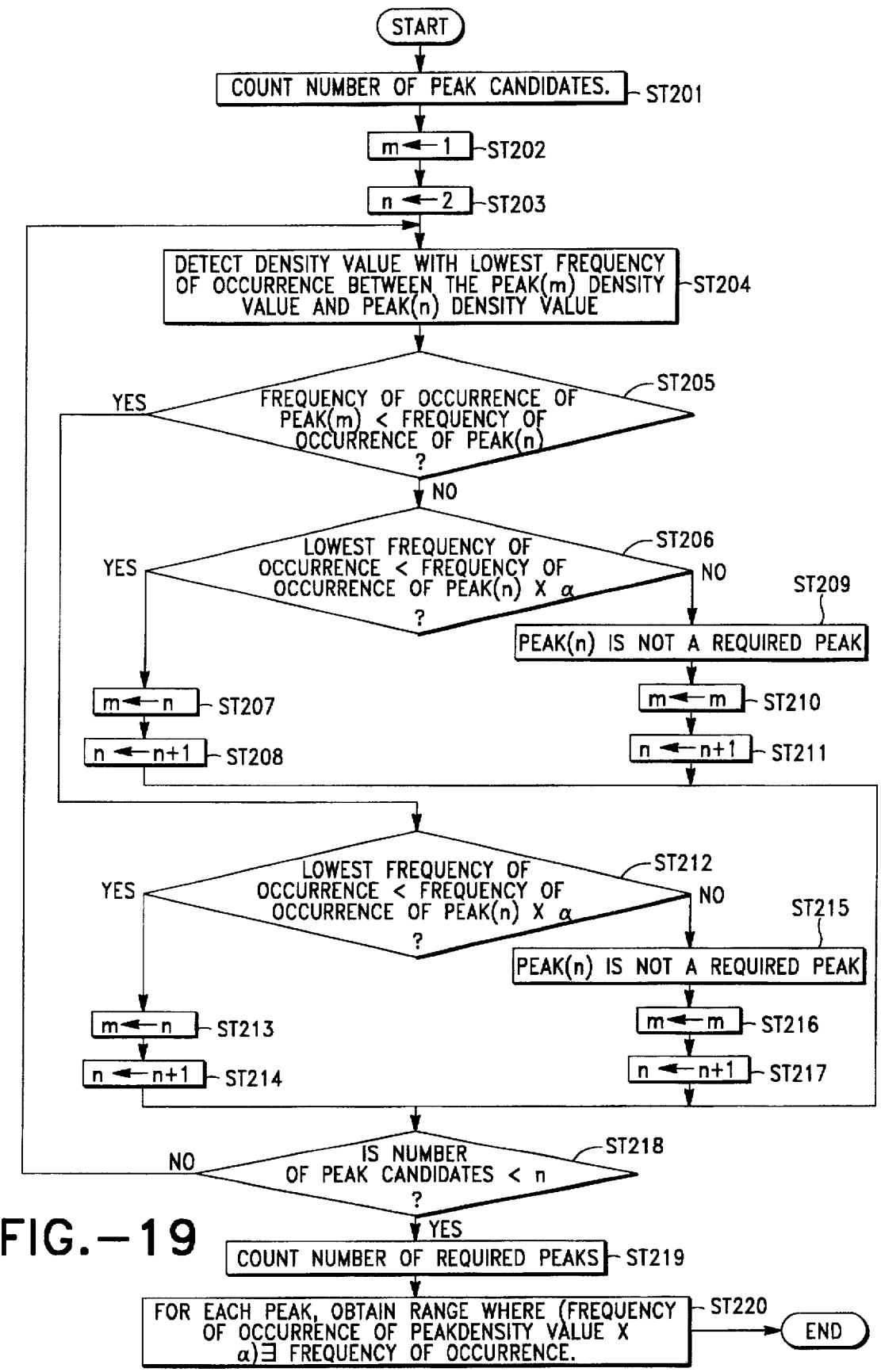
FIG. 19 is a flow chart used to describe the process for detecting the required peaks by the temporary digitization threshold value calculator shown in FIG. 17.

Referring to FIG. 19, the first step ST201 is therefore to detect those parts of the density histogram where the frequency of occurrence is highest (the "peak candidates" below), and to then count these peak candidates. The peak candidates are sequentially numbered from the left (black side) and labelled as peak(m), peak(n) . . . where m and n are positive integers.

It is then determined from step ST202 to step ST218 whether each of these peaks is a required peak as follows.

At step ST202, m is assigned a value of 1, and at step ST203 n is assigned a value of 2. The minimum frequency of occurrence minP of the density values between the density values of peak(m) and peak(n) is then detected (step ST204), and the frequency of occurrence of the peak(m) density value and the frequency of occurrence of the peak(n) density value are compared (step ST205). If the frequency of occurrence of the peak(m) density value $\geq$ the frequency of occurrence of the peak(n) density value in step ST205, control passes to step ST206 in which the minimum frequency of occurrence minP obtained at step ST204 is compared with the frequency of occurrence of the peak(n) density value as adjusted by constant α. Note that constant α<1, and α=½ in this example.

If however, in step ST205 it is determined that frequency of occurrence of peak(m)$\geq$that of peak (n), control instead transfers to step ST212 discussed hereinbelow.

In step ST206, it is determined that the minimum frequency of occurrence minP<(frequency of occurrence of the peak(n) density value×constant α), m is assigned the value of n (step ST207), and n is then incremented to n+1 (step ST208). If peak(1) and peak(2) were being processed at this time, these incrementing steps increment the peaks being evaluated to peak(2) and peak(3), for which the process from step ST218 is then executed.

If in step ST206, however, the minimum frequency of occurrence minP (frequency of occurrence of the peak(n)

density value×constant α), peak(n) is eliminated from the peak candidates (i.e., it is designated as not a required peak) in step ST209; m is therefore reassigned to itself (m=m) (step ST210), and n is then incremented to n+1 in step ST211. If peak(1) and peak(2) were being processed at this time, these incrementing steps adjust the peaks being evaluated to peak(1) and peak(3), for which the process from step ST218 is then executed.

However, if in step ST205 the frequency of occurrence of the peak(m) density value<the frequency of occurrence of the peak(n) density value, step ST205 skips forward to step ST212 as noted above, and the minimum frequency of occurrence minP obtained at step ST204 is compared with the (frequency of occurrence of the peak(m) density value× constant α). As above, constant α<1, and α=½ in this example.

If in step ST212 the minimum frequency of occurrence minP<(frequency of occurrence of the peak(m) density value×constant α), m is assigned the value of n (step ST213), and n is then incremented to n+1 (step ST214). If peak(1) and peak(2) were being processed at this time, these incrementing steps increment the peaks being evaluated to peak(2) and peak(3), for which the process from step ST218 is then executed.

If peak(1) and peak(2) were being processed at this time, these incrementing steps increment the peaks being evaluated to peak(2) and peak(3), for which the process from step ST218 is then executed.

If in step S212, however, the minimum frequency of occurrence minP≧(frequency of occurrence of the peak(m) density value×constant α), peak(m) is similarly eliminated from the peak candidates in step ST215; m is therefore assigned the value of n (step ST216), and n is then incremented to n+1 (step ST217). Thus, as above, if peak(1) and peak(2) were being processed at this time, the next peaks evaluated are peak(2) and peak(3), for which the process from step ST218 is then executed.

At step St218, it is then determined whether n is greater than the number of peak candidates. If n> the number of peak candidates, the number of required peaks is counted (step ST219), and the range where the (frequency of occurrence of each peak×α) the frequency of occurrence is obtained for each peak in step ST220.

If, however, n≧ the number of peak candidates as determined in step ST218), processing loops back to step ST204.

This operation is described below with reference to the example density histogram shown in FIG. 18.

At step ST204, the minimum frequency of occurrence minP of the density values (minP1 here) between the density values of peak(1) and peak(2) is detected. In this example the minimum frequency of occurrence minP1 appears at density value "5".

The frequency of occurrence of the peak(1) density value and the frequency of occurrence of the peak(2) density value are then compared (step ST205). In this example the frequency of occurrence of the peak(1) density value≧the frequency of occurrence of the peak(2) density value. The minimum frequency of occurrence minP1 obtained at step ST204 is therefore compared with the (frequency of occurrence of the peak(2) density value×½) (because constant α=½ in this example) (step ST206). Note that the level of (frequency of occurrence of the peak(2) density value×½) is indicated by dot-dot-dash line X2 in FIG. 18.

Because the minimum frequency of occurrence minP1< (frequency of occurrence of the peak(2) density value×½) in this example, m is reassigned to n (m=2) (step ST207), and n is incremented to n+1 (step ST208). In other words, peak(2) and peak(3) are processed from step ST218.

At step ST218 it is determined whether n is greater than the number of peak candidates. In this case, both n=3 and the number of peak candidates equals 3. As a result, the process loops back to step ST204.

At step ST204, the minimum frequency of occurrence minP2 of the density values between the density values of peak(2) and peak(3) is detected. In this example the minimum frequency of occurrence minP2 appears at density value "10".

The frequency of occurrence of the peak(2) density value and the frequency of occurrence of the peak(3) density value are then compared (step ST205). In this example the frequency of occurrence of the peak(2) density value<the frequency of occurrence of the peak(3) density value. The minimum frequency of occurrence minP2 obtained at step ST204 is therefore compared with the (frequency of occurrence of the peak(2) density value×½) (step ST206). Note that the level of (frequency of occurrence of the peak(2) density value×½) is indicated by dot-dot-dash line X2 in FIG. 18 as above.

Because the minimum frequency of occurrence minP2≧ (frequency of occurrence of the peak(2) density value×½) in this example, peak(2) is eliminated from the peak candidates (i.e., it is designated as not a required peak) in step ST215, m is then reassigned to n (m=3; step ST216), and n is incremented to n+1 (n=4; step ST217). In other words, if peaks (2) and (3) are being processed, then peaks (3) and (4) are processed from step ST218.

At step ST218 it is determined whether n is greater than the number of peak candidates. In this case, n=4 and the number of peak candidates equals 3. As a result, the number of peak candidates determined to be required peaks is counted (step ST219). More specifically, the number of peaks counted in step ST219 is the number of peak candidates determined necessary based on the relative frequency of occurrence of the density values represented thereby, and in the present example is the number of peaks not including peak(2), i.e., peak(1) and peak(3).

For each of the detected peaks ((1) and (3) in this example), a frequency of occurrence range (E1 and E3, respectively) greater than the (frequency of occurrence of the peak density value×α) (where α=½ in this example) is then defined (step ST220). Specifically, the (frequency of occurrence of peak(1)×½) is indicated by the dot-dot-dash line X1 in FIG. 18, and the frequency of occurrence range E1 corresponding to the area<?> above this dot-dot-dash line X1 (on this line in FIG. 18) is set. Similarly, the (frequency of occurrence of peak(3)×½) is indicated by the dot-dot-dash line X3 in FIG. 18, and the frequency of occurrence range E3 corresponding to the area<?> above this dot-dot-dash line X3 (on this line in FIG. 18) is set.

By means of this process, only peaks (1) and (3) of peaks (1), (2), and (3) are detected as valid peaks, and peak (2) is discarded.

When the peaks are detected in the manner described above, the temporary digitization threshold value is determined as follows.

Figure 20A:
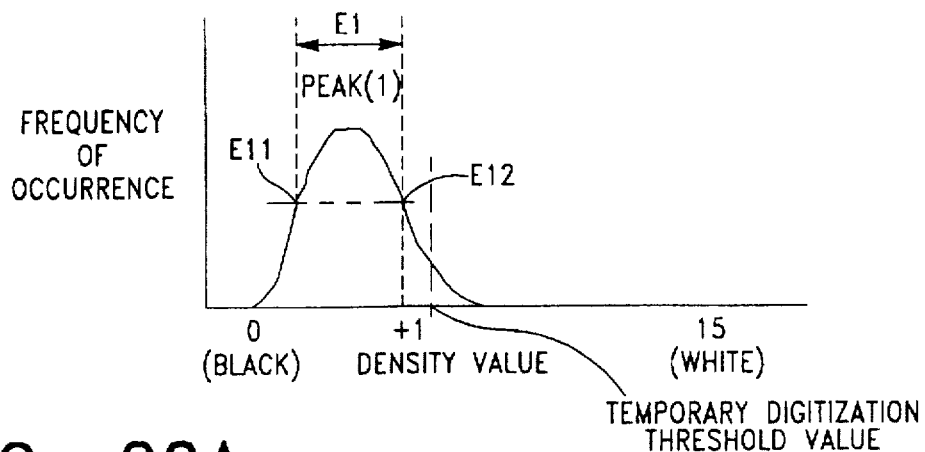
FIGS. 20A–20C graphically illustrate the method of determining the temporary digitization threshold value by the temporary digitization threshold value calculator shown in FIG. 17.

Referring to FIG. 20A, when there is only one detected peak, the temporary digitization threshold value is obtained by adding a particular value (+1 in this case) to the end (E12) of the frequency of occurrence range (range E1 in this case) corresponding to that peak, and detecting the density value at that point (E12+1), see FIG. 20A.

Figure 20B:
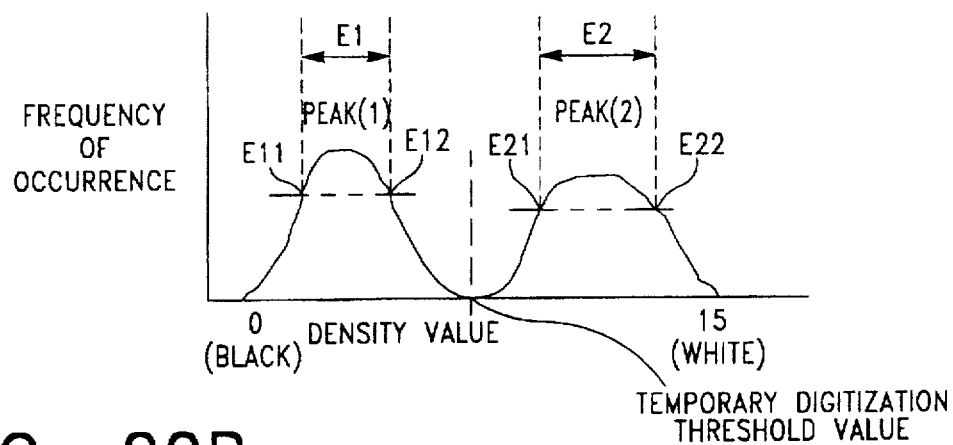

If there are plural peaks, the density value at the point midway between the beginning of the peak closest to the white side of the scale, and the end of the second peak from the white side of the scale is defined as the temporary digitization threshold value. For example, when there are two peaks as shown in FIG. 20B, the density value at the midpoint between the beginning (point E21 of frequency of occurrence range E2) of the peak closest to the white side (peak(2) in this example) and the end (point E12 of range E1) of the second peak (peak(1) in this example) from the white side of the scale is defined as the temporary digitization threshold value.

Figure 20C:
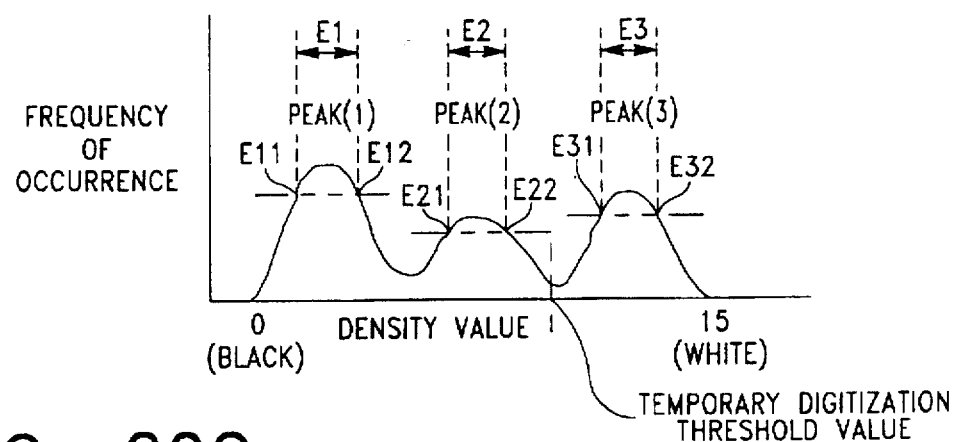

If three peaks are detected as shown in FIG. 20C, the density value at the point midway between the beginning of the peak closest to the white side of the scale, and the end of the second peak from the white side of the scale is still defined as the temporary digitization threshold value. In this example, the beginning of the white-side peak(3) is at point E31 of frequency of occurrence range E3, the end of the second peak(2) from the white side of the scale is at point E22 of range E2, and the density value at the midpoint therebetween (the dotted line in FIG. 20 (c)) is set as the temporary digitization threshold value.

It is thus possible to determine the temporary digitization threshold value by means of the alternative process described above, and the present invention can be achieved using the temporary digitization threshold value thus obtained. This method of the invention furthermore enables processing to be executed faster than is possible with the Otsu method, and is thus preferred when speed concerns outweigh accuracy constraints. It is to be further noted that the present invention shall not be limited to the two methods described above, and other methods may also be used as will become readily apparent to an ordinary skill in the relevant art.

The preceding embodiments of the invention have also been described as obtaining one temporary digitization threshold value for each block, but it is also possible to obtain plural temporary digitization threshold values for each block.

In addition, the subject presence evaluator 3 has been described as evaluating subject presence in each block by using a density dispersion value as the feature quantity for subject presence evaluation, and comparing this density dispersion value (feature quantity) with a predetermined evaluation value. It is alternatively possible, however, to use maximum among-class dispersion values or maximum density difference values in place of the density dispersion values as the feature quantity.

Figure 21:
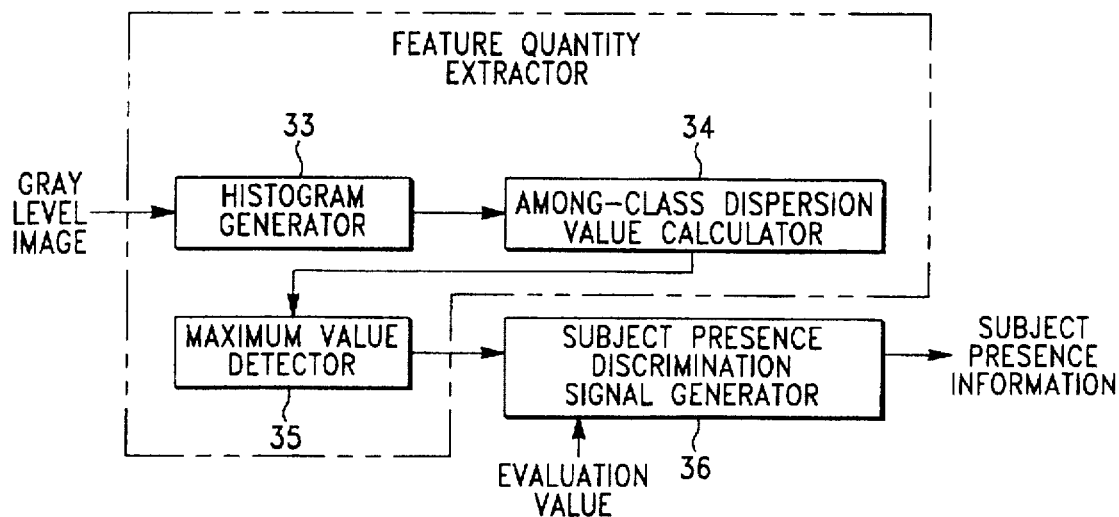
FIG. 21 is a more detailed block diagram of an alternative subject presence evaluator which uses an among-class dispersion value as the feature quantity according to the present invention.

FIG. 21 is a block diagram of the subject presence evaluator 3 using the maximum among-class dispersion values as the feature quantity for evaluating subject presence. In this case the feature quantity extraction means comprises a histogram generator 33 for generating a density histogram of the gray level images input in block units; an among-class dispersion value calculator 34 for obtaining the among-class dispersion value of each density value from the density histogram obtained by the histogram generator 33; and a maximum value detector 35 for detecting the maximum among-class dispersion value from the among-class dispersion values obtained by the among-class dispersion value calculator 34.

The maximum among-class dispersion value obtained by the maximum value detector 35 of the feature quantity extraction means is then compared with an evaluation value by the subject presence discrimination signal generator 36.

If the maximum among-class dispersion value is greater than the evaluation value, the subject presence discrimination signal generator 36 outputs a signal indicating subject text or objects are present; if not, the output signal indicates subject text or objects are not present.

Figure 22:
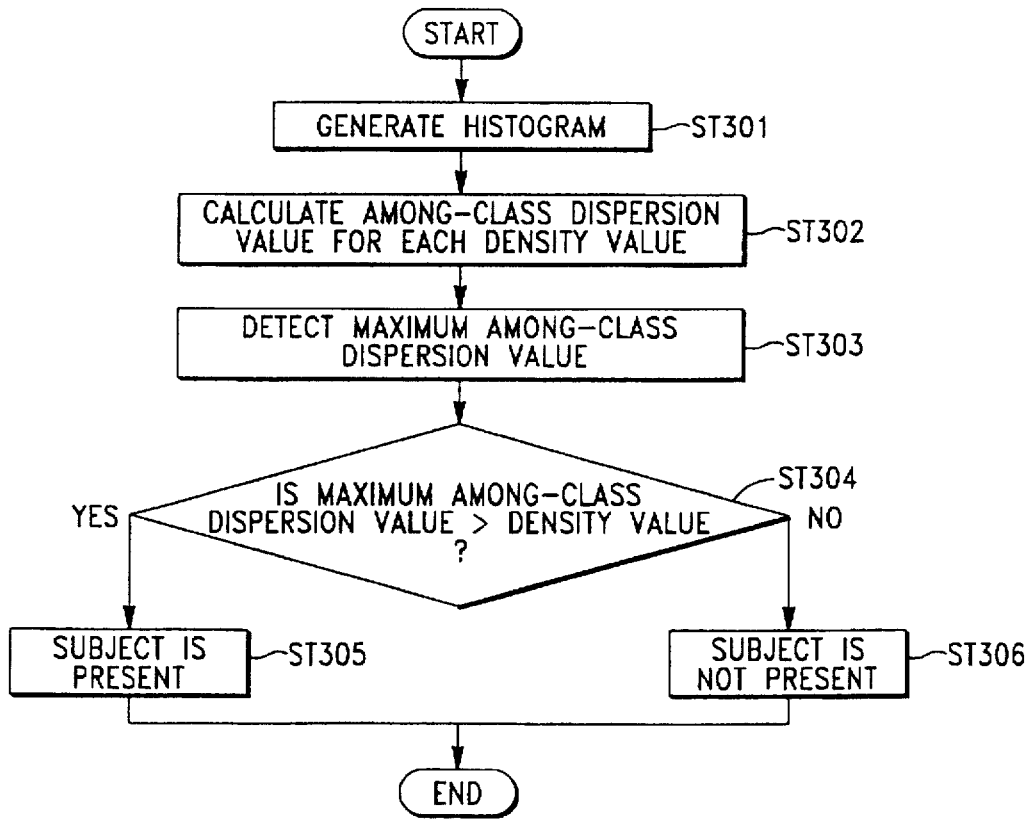
FIG. 22 is a flow chart used to describe the operation of the subject presence evaluator shown in FIG. 21.

The operation of the subject presence evaluator 3 thus comprised is described below with reference to the flow chart in FIG. 22. Control herein begins at step ST301, with the gray level image input in block units being relayed to the histogram generator 33 and a corresponding density histogram. The generated histogram is then transferred to the among-class dispersion value calculator 34, which calculates the among-class dispersion value for each density value (step ST302), and outputs the result to the maximum value detector 35. Control then passes to step ST303, where the maximum value detector 35 then detects the maximum among-class dispersion value, and outputs this maximum value to the subject presence discrimination signal generator 36.

Meanwhile, previously an evaluation value has been input to the subject presence discrimination signal generator 36 from an external source as a parameter of the comparison operation. When control passes to step ST304, the subject presence discrimination signal generator 36 thus compares the maximum among-class dispersion value with this evaluation value. If the maximum among-class dispersion value is greater than the evaluation value, it is determined that subject text or objects are present (step ST305). If not, it is determined that subject text or objects are not present (step ST306).

In other words, if subject text or objects are present, the histogram will be a curve with two peaks as shown in prior art FIG. 28A, and the among-class dispersion value curve obtained therefrom will have a high peak value as shown in FIG. 28B. However, if subject text or objects are not present, the histogram will have only one peak as shown in prior art FIG. 31A, and the among-class dispersion value curve obtained therefrom will have a peak as shown in FIG. 31B. Note that this peak is smaller than that obtained when subject text or objects are present.

It is therefore possible to determine the subject presence by using the maximum among-class dispersion value in place of the density dispersion value as the feature quantity, and comparing this maximum among-class dispersion value with an evaluation value.

A further alternative embodiment in which the maximum density difference is used as the feature quantity for subject presence determination is described below.

FIG. 23 is a block diagram of the subject presence evaluator 3 using the maximum density difference as the feature quantity for evaluating subject presence. In this case a maximum density difference calculator 37 for calculating the maximum density difference in the gray level image input thereto in block units is used as the feature quantity extraction means of the subject presence evaluator 3. In this case, the maximum density difference obtained by the maximum density difference calculator 37 is input to the subject presence discrimination signal generator 38 for comparison with an evaluation value. If the maximum density difference is greater than the evaluation value, the subject presence discrimination signal generator 38 outputs a signal indicating subject text or objects are present; if not, the output signal indicates subject text or objects are not present.

The operation of the subject presence evaluator 3 thus comprised is described below with reference to the flow chart in FIG. 24.

Control herein begins at step ST401, where the gray level image input in block units is input to the maximum density difference calculator 37 and the maximum density difference is calculated.

Also, preferably in step ST401, an appropriate externally-generated evaluation value is input to the subject presence discrimination signal generator 38 as is known in the imaging arts. Next, in step ST402, the subject presence discrimination signal generator 38 compares the maximum density difference with this evaluation value. If the maximum density difference is greater than the evaluation value, it is determined that subject text or objects are present (step ST403); if not, it is determined that subject text or objects are not present (step ST404).

In other words, if there is only background information in the block, the difference between the individual pixels in the block will be slight, and the maximum density difference within the block will be small. If the subject (text) is present in the block, however, there will be a large difference between pixel densities, and the maximum density difference of the block in which subject text or objects are present will be greater than the maximum density difference of the blocks containing only background.

It is therefore possible to determine the subject presence by comparing the maximum density difference obtained for each block with a predetermined evaluation value.

It is therefore also possible to determine the subject presence by obtaining the maximum density difference between the pixels within each block, and comparing this maximum density difference with an evaluation value.

It is also possible to determine the subject presence using at least two of the above three feature quantity values (density dispersion value, maximum among-class dispersion value, and maximum density difference). An alternative embodiment using two of these values (the density dispersion value and the maximum among-class dispersion value) is described below with reference to FIG. 25, a block diagram thereof.

The first feature quantity extraction means of the subject presence evaluator 3 in this embodiment comprises a histogram generator 33, among-class dispersion value calculator 34, and maximum value detector 35. The second feature quantity extraction means of the subject presence evaluator 3 in this embodiment comprises a density dispersion value calculator 31.

The maximum among-class dispersion value obtained by the first feature quantity extraction means is compared by the maximum value comparator 50 with an evaluation value. If the maximum among-class dispersion value is greater than the evaluation value, the maximum value comparator 50 outputs a particular signal (e.g., "1").

The density dispersion value output from the second feature quantity extraction means is similarly compared with an evaluation value by the dispersion value comparator 51. If the density dispersion value is greater than the evaluation value, the dispersion value comparator 51 also outputs a particular signal (e.g., "1").

The output signals from the maximum value comparator 50 and dispersion value comparator 51 are both input to the subject presence discrimination signal generator 52, which may be an AND circuit or other logic device. The subject presence discrimination signal generator 52 outputs the "subject is present" signal only when both the maximum among-class dispersion value is greater than the evaluation value and the density dispersion value is greater than the evaluation value.

By thus using two or more feature quantity values, the subject presence can be determined with even greater accuracy.

Therefore, the present invention describes an image processing method and an image processing apparatus for determining the best digitizing threshold value, thereby enabling best-case digitizing across the entire input image, even when determination of a subject image within an image block is mistaken. The input image is preferably separated into plural blocks; a temporary digitization threshold value is calculated for each of the separated blocks; the presence of text characters or other predetermined subject images is evaluated in each of the separated blocks; and block information for each of the separated blocks, including the temporary digitization threshold value, subject presence information, and the final digitization threshold value of each block for which said threshold value has been determined, is referenced to determine the final digitization threshold value for each block. Each block is then digitized using these best-case threshold values to achieve consistent, best-case digitization across the entire input image.

While the invention has been described in conjunction with several specific embodiments, it is evident to those skilled in the art that many further alternatives, modifications and variations will be apparent in light of the forgoing description. Thus, the invention described herein is intended to embrace all such alternative, modifications, applications and variations as may fall within the spirit and scope of the appended claims.

What is claimed is:

1. An image processing method comprising:
   an image separation process for separating an input image into plural blocks;
   a temporary digitization threshold value calculating process for calculating a temporary digitization threshold value for each of the blocks separated by the image separation process;
   a subject presence evaluation process for determining whether a predetermined subject, comprising text characters, is present in each of the blocks separated by the image separation process;
   a block information storing process for storing as the block information
      the digitization threshold values of each block for which the final digitization threshold value has been obtained, and
      the temporary digitization threshold value and subject presence information obtained for each block by the temporary digitization threshold value calculating process and the subject presence evaluation process, respectively;
   a final digitization threshold value determining process for determining the final digitization threshold value for each of the blocks using the block information of the one block and peripheral ones of the blocks stored by the block information storing process; and
   a digitization process for digitizing the input image using the final digitization threshold value determined for each block by the final digitization threshold value determining process.

2. An image processing method according to claim 1 wherein the temporary digitization threshold value calculating process is characterized by:
   a histogram generating process for generating a density histogram of the input image;
   an among-class dispersion calculating process for calculating the among-class dispersion value of each density value in the density histogram obtained by the histogram generating process; and a maximum value detecting process for detecting the maximum among-class dispersion values obtained by the among-class dispersion calculating process, and outputting as the temporary digitization threshold value the density value of the among-class dispersion value peak.

3. An image processing method according to claim 1 wherein the temporary digitization threshold value calculating process is characterized by:

a histogram generating process for generating a density histogram of the input image;

a peak detection process for detecting only the peaks required to obtain the temporary digitization threshold value from the density histogram obtained by the histogram generating process; and a temporary digitization threshold value calculating process for obtaining the temporary digitization threshold value based on the peaks detected by said peak detection process.

4. An image processing method according to claim 3 wherein the peak detection process determines, when there are plural peak candidates in the density histogram obtained by the histogram generating process, which of the plural peak candidates is the peak required to obtain the temporary digitization threshold value based on the frequencies of occurrence of the density value in each of the plural peak candidates, and the comparative relationship between the frequency of occurrence of the density value in peak candidates being compared.

5. An image processing method according to claim 4 wherein the temporary digitization threshold value calculating process is characterized by:

defining as the temporary digitization threshold value the density value corresponding to a predetermined position at either the rise side or the drop side of the detected peak when there is only one peak detected by the peak detection process, and defining as the temporary digitization threshold value the density value corresponding to a predetermined position between adjacent peaks when plural peaks are detected by the peak detection process.

6. An image processing method according to claim 1 wherein the subject presence evaluation process is characterized by:

a feature quantity extraction process for extracting a feature quantity based on the density distribution of the input image in each separated block; and a subject presence discrimination signal output process for determining the subject presence by comparing the feature quantity obtained by the feature quantity extraction process with a predetermined evaluation value supplied as an input parameter of the comparison operation.

7. An image processing method according to claim 6 wherein the feature quantity of the density distribution is the density dispersion value of the input image in each block.

8. An image processing method according to claim 6 wherein the feature quantity of the density distribution is the maximum among-class dispersion value obtained based on the density histogram obtained from the input image in each block.

9. An image processing method according to claim 6 wherein the feature quantity of the density distribution is the maximum density difference of the input image in each block.

10. An image processing method according to claim 1 wherein the subject presence evaluation process is characterized by:

a feature quantity extraction process for extracting as the feature quantity at least two of following three feature quantities of the input image in each block:
the density dispersion value,
the maximum among-class dispersion value, and
the maximum density difference; and a subject presence discrimination signal output process for determining the subject presence by comparing the feature quantities obtained by the feature quantity extraction process with predetermined evaluation values supplied as input parameters of the comparison operation.

11. An image processing method according to claim 1 wherein the final digitization threshold value determining process defines a reference range comprising plural blocks around the target block for which the digitization threshold value is to be determined, and determines the final digitization threshold value of the target block based on the temporary digitization threshold value of the target block and an already-determined final digitization threshold value or temporary digitization threshold value of at least one block in said reference range.

12. An image processing method according to claim 11 where when subject text or objects are determined to not be present in any blocks in the reference range, excluding the target block, the digitization threshold value of the target block is obtained by determining whether subject text or objects are present in the target block, and is determined to be the temporary digitization threshold value of the target block when subject text or objects are determined to be present in the target block, and is determined by referencing an already-determined digitization threshold value in the reference range when subject text or objects are determined to not be present in the target block.

13. An image processing method according to claim 11 where when subject text or objects are determined to be present in one or more blocks of the reference range, excluding the target block, the digitization threshold value of the target block is obtained by determining whether subject text or objects are present in the target block, and is determined from a temporary digitization threshold value in the reference range and the temporary digitization threshold value of the target block when subject text or objects are determined to be present in the target block, and is determined from the temporary digitization threshold values in the reference range when subject text or objects are determined to not be present in the target block.

14. An image processing method according to claim 11 or claim 13 wherein the final digitization threshold value of the target block is obtained by calculation from the temporary digitization threshold value of the target block and the temporary digitization threshold value of at least one block in the reference range.

15. An image processing method according to claim 11 or claim 13 wherein the final digitization threshold value of the target block is determined by means of a logic operation obtaining the minimum value of the temporary digitization threshold values of the target block and each block in the reference range, and defining this minimum temporary digitization threshold value as the final digitization threshold value of the target block.

16. An image processing method according to claim 15 where when the minimum temporary digitization threshold value in the reference range is defined as the final digitization threshold value to be obtained, the final digitization threshold value of the target block is defined, depending upon the conditions, to be the sum of a predetermined value added to the minimum temporary digitization threshold value in the reference range.

17. An image processing method comprising:

an image separation process for separating an input image into plural blocks;

a temporary digitization threshold value calculating process for calculating a temporary digitization threshold value for each of the blocks separated by the image separation process;

a subject presence evaluation process for determining whether a predetermined subject, comprising text characters, is present in each of the blocks separated by the image separation process;

a block information storing process for storing as the block information
the digitization threshold values of each block for which the final digitization threshold value has been obtained, and
the temporary digitization threshold value and subject presence information obtained for each block by the temporary digitization threshold value calculating process and the subject presence evaluation process, respectively;

a final digitization threshold value determining process for determining the final digitization threshold value for each block using the block information stored by the block information storing process; and a digitization process for digitizing the input image using the final digitization threshold value determined for each block by the final digitization threshold value determining process, wherein the final digitization threshold value determining process
defines a reference range comprising plural blocks around the target block for which the digitization threshold value is to be determined, and
determines the final digitization threshold value of the target block based on the temporary digitization threshold value of the target block and an already-determined final digitization threshold value or temporary digitization threshold value of at least one block in said reference range, and wherein the reference range is defined relative to the target block:
in the line direction as a variable number of blocks dependent upon the detected subject presence in each block, and
in the column direction as at least one block line above and one block line below the block line of the target block.

18. An image processing apparatus comprising:

an image separator for separating an input image into plural blocks;

a temporary digitization threshold value calculator for calculating a temporary digitization threshold value for each of the blocks separated by the image separator;

a subject presence evaluator for determining whether a predetermined subject, comprising text characters, is present in each of the blocks separated by the image separator;

a block information store for storing as the block information
the digitization threshold values of each block for which the final digitization threshold value has been obtained, and
the temporary digitization threshold value and subject presence information obtained for each block by the temporary digitization threshold value calculator and the subject presence evaluator, respectively;

a final digitization threshold value determiner for determining the final digitization threshold value for each of the blocks using the block information of the one block and peripheral ones of the blocks stored by the block information store; and a digitizer for digitizing the input image using the final digitization threshold value determined for each block by the final digitization threshold value determiner.

19. An image processing apparatus according to claim 18 wherein the temporary digitization threshold value calculator is characterized by:

a histogram generating means for generating a density histogram of the input image;

an among-class dispersion calculator for calculating the among-class dispersion value of each density value in the density histogram obtained by the histogram generating means; and a maximum value detecting means for detecting the maximum among-class dispersion values obtained by the among-class dispersion calculator, and
outputting as the temporary digitization threshold value the density value of the among-class dispersion value peak.

20. An image processing apparatus according to claim 18 wherein the temporary digitization threshold value calculator is characterized by:

a histogram generating means for generating a density histogram of the input image;

a peak detection means for detecting only the peaks required to obtain the temporary digitization threshold value from the density histogram obtained by the histogram generating means; and a temporary digitization threshold value calculator for obtaining the temporary digitization threshold value based on the peaks detected by said peak detection means.

21. An image processing apparatus according to claim 20 wherein the peak detection means determines, when there are plural peak candidates in the density histogram obtained by the histogram generating means, whether one of plural peak candidates is the peak required to obtain the temporary digitization threshold value based on the frequencies of occurrence of the density value in each of the plural peak candidates, and the comparative relationship between the frequencies of occurrence of the density value in peak candidates being compared.

22. An image processing apparatus according to claim 21 wherein the temporary digitization threshold value calculator is characterized by:

defining as the temporary digitization threshold value the density value corresponding to a predetermined position at either the rise side or the drop side of the detected peak when there is only one peak detected by the peak detection process, and defining as the temporary digitization threshold value the density value corresponding to a predetermined position between adjacent peaks when plural peaks are detected by the peak detection process.

23. An image processing apparatus according to claim 18 wherein the subject presence evaluator is characterized by:

a feature quantity extraction means for extracting a feature quantity based on the density distribution of the input image in each separated block; and a subject presence discrimination signal generator for determining the subject presence by comparing the feature quantity obtained by the feature quantity extraction means with a predetermined evaluation value supplied as an input parameter of the comparison operation.

24. An image processing apparatus according to claim 23 wherein the feature quantity of the density distribution is the density dispersion value of the input image in each block.

25. An image processing apparatus according to claim 23 wherein the feature quantity of the density distribution is the maximum among-class dispersion value obtained based on the density histogram obtained from the input image in each block.

26. An image processing apparatus according to claim 23 wherein the feature quantity of the density distribution is the maximum density difference of the input image in each block.

27. An image processing apparatus according to claim 18 wherein the subject presence evaluator is characterized by:

a feature quantity extraction means for extracting as the feature quantity at least two of following three feature quantities of the input image in each block:
the density dispersion value,
the maximum among-class dispersion value, and
the maximum density difference; and a subject presence discrimination signal generator for determining the subject presence by comparing the feature quantities obtained by the feature quantity extraction means with predetermined evaluation values supplied as input parameters of the comparison operation.

28. An image processing apparatus according to claim 18 wherein the final digitization threshold value determiner defines a reference range comprising plural blocks around the target block for which the digitization threshold value is to be determined, and determines the final digitization threshold value of the target block based on the temporary digitization threshold value of the target block and an already-determined final digitization threshold value or temporary digitization threshold value of at least one block in said reference range.

29. An image processing apparatus according to claim 28 where when subject text or objects are determined to not be present in any blocks in the reference range, excluding the target block, the digitization threshold value of the target block is obtained by determining whether subject text or objects are present in the target block, and is determined to be the temporary digitization threshold value of the target block when subject text or objects are determined to be present in the target block, and is determined by referencing an already-determined digitization threshold value in the reference range when subject text or objects are determined to not be present in the target block.

30. An image processing apparatus according to claim 28 where when subject text or objects are determined to be present in one or more blocks of the reference range, excluding the target block, the digitization threshold value of the target block is obtained by determining whether subject text or objects are present in the target block, and is determined from a temporary digitization threshold value in the reference range and the temporary digitization threshold value of the target block when subject text or objects are determined to be present in the target block, and is determined from the temporary digitization threshold values in the reference range when subject text or objects are determined to not be present in the target block.

31. An image processing apparatus according to claim 28 or claim 30 wherein the final digitization threshold value of the target block is obtained by calculation from the temporary digitization threshold value of the target block and the temporary digitization threshold value of at least one block in the reference range.

32. An image processing apparatus according to claim 28 or claim 30 wherein the final digitization threshold value of the target block is determined by means of a logic operation obtaining the minimum value of the temporary digitization threshold values of the target block and each block in the reference range, and defining this minimum temporary digitization threshold value as the final digitization threshold value of the target block.

33. An image processing apparatus according to claim 32 where when the minimum temporary digitization threshold value in the reference range is defined as the final digitization threshold value to be obtained, the final digitization threshold value of the target block is defined, depending upon the conditions, to be the sum of a predetermined value added to the minimum temporary digitization threshold value in the reference range.

34. An image processing apparatus comprising:

an image separator for separating an input image into plural blocks:

a temporary digitization threshold value calculator for calculating a temporary digitization threshold value for each of the blocks separated by the image separator:

a subject presence evaluator for determining whether a predetermined subject, comprising text characters, is present in each of the blocks separated by the image separator:

a block information store for storing as the block information
the digitization threshold values of each block for which the final digitization threshold value has been obtained, and
the temporary digitization threshold value and subject presence information obtained for each block by the temporary digitization threshold value calculator and the subject presence evaluator, respectively;

a final digitization threshold value determiner for determining the final digitization threshold value for each block using the block information stored by the block information store; and a digitizer for digitizing the input image using the final digitization threshold value determined for each block by the final digitization threshold value determiner wherein the temporary digitization threshold value calculator is characterized by:

a histogram generating means for generating a density histogram of the input image;

a peak detection means for detecting only the peaks required to obtain the temporary digitization threshold value from the density histogram obtained by the histogram generating means; and a temporary digitization threshold value calculator for obtaining the temporary digitization threshold value based on the peaks detected by said peak detection means, and wherein the reference range is defined relative to the target block:

in the line direction as a variable number of blocks dependent upon the presence of the subject in each block, and in the column direction as at least one block line above and one block line below the block line of the target block.

* * * * *